(12) United States Patent
Polacsek

(10) Patent No.: US 6,948,910 B2
(45) Date of Patent: Sep. 27, 2005

(54) SPIRAL-BASED AXIAL FLOW DEVICES

(76) Inventor: Ronald R. Polacsek, 73373 Joshua Tree St., Palm Desert, CA (US) 92260

( * ) Notice: Subject to any disclaimer, the term of this patent is extended or adjusted under 35 U.S.C. 154(b) by 375 days.

(21) Appl. No.: 10/194,386

(22) Filed: Jul. 12, 2002

(65) Prior Publication Data
US 2004/0009063 A1 Jan. 15, 2004

(51) Int. Cl.[7] .............................................. B64C 11/18
(52) U.S. Cl. ..................................... 416/1; 416/227 R
(58) Field of Search ............................... 416/1, 227 R, 416/227 A, 223 R, 223 A

(56) References Cited

U.S. PATENT DOCUMENTS

| 547,210 | A | | 10/1895 | Haussmann | |
|---|---|---|---|---|---|
| 1,864,848 | A | * | 6/1932 | Munk | 416/132 R |
| 1,868,113 | A | | 7/1932 | Ljungstrom | |
| 2,552,651 | A | | 5/1951 | Skold | |
| 3,504,990 | A | | 4/1970 | Sugden | |
| 3,514,215 | A | * | 5/1970 | Williams | 416/200 R |
| 4,445,817 | A | | 5/1984 | Wethern | |
| 4,610,601 | A | | 9/1986 | Gerfast | |
| 4,813,633 | A | * | 3/1989 | Werle et al. | 244/130 |
| 4,830,315 | A | * | 5/1989 | Presz et al. | 244/200 |
| 4,830,574 | A | | 5/1989 | Wainauski | |
| 5,075,964 | A | | 12/1991 | Galliet | |
| 5,890,875 | A | | 4/1999 | Silvano | |
| 5,961,289 | A | | 10/1999 | Lohmann | |
| 2003/0012656 | A1 | * | 1/2003 | Cho et al. | 416/235 |
| 2004/0067138 | A1 | * | 4/2004 | Yoshida | 416/223 R |

OTHER PUBLICATIONS

Harry F. Olsen–"Music,Physics and Engineering" pp 208–215 © 1967, Book No 486–21769–8, Dover Publishing, Canada.

William C. Elmore, Mark A. Heald– "Physics of Waves" © 1969 P.P. 5–35, 203–205, 234–235, ISBN–0486 64926–1, Dover Publ., Canada.

A.A. Andronov, AA. Viti, "Theory of Oscillators." © 1966, pp 56–58, 199–200, ISBDN–0486–65508–3, Dover Publishing, Canada.

Erik Anderson et al, Journal of Experimental Biology, "The Boundary Layer of Swimming Fish" pp 81–102 © Dec. 5, 2000, © The Company of Biologists, Great Britain.

Stephen Strogatz, "Nonlinear Dynamics and Chaos" © 1994 pp 262–279, ISBDN 0–7382–0453–6 © Perseus Books, USA.

(Continued)

Primary Examiner—Edward K. Look
Assistant Examiner—Richard Edgar

(57) ABSTRACT

Axial flow devices using rigid spiral band profiled blade catenaries attached variably along and around an axially elongated profiled hub, of axially oriented profile section sequences 75 mapped relative to truncated cones-of-generation. Upon rotation and lubricity-masked progression through axial planes-of-shear, this time-domain sequence travels in 2-dimensional axial-datum-plane-relative path-excursions and ejects frictional adhesions via anguillar reverse vortex street thrust due to an after-body accelerating wave shape-sequence 48. This guides bound vortex pressures at linear path-velocity substantially parallel to the collective plane-of-shear, conferring higher differential pressures through path-vector-addition, improved force-vector orientation, extended laminar flows, lower form drag and tip vorticity. As a wind turbine, path-vectors are added to inflow, ducting an increased mass flow inward for increased power extraction per diameter. As a propeller, path-vector-subtraction guides the wave front flight-path-transverse, allowing higher flight velocities and improving thrust-per-torque through enhanced force vectors and mass flow rates.

7 Claims, 17 Drawing Sheets axial plane movement

OTHER PUBLICATIONS

L. Prandtl, O.G. Tietjens, "Applied Hydro–and Aeromechanics"© 1934 pp 166–167, 190–191, 200–209, 300–308, ISBDN 486–60375–X © 1957, Dover Books, USA.

H.H. Hurt Jr, "Aerodynamics for Naval Aviators" © US Navy 1960 pp 67, 64, 57, 53, 48, 19/46, 227;232, 205 Navair 00–80T–80 © Office & Chief of Naval Operation.

Kalus Hünecke,"Jet Engines" © 1997, pp 34–48 ISBDN 0–7603–0459–9 © Airlife Publishing, Great Britain.

Hunter Rouse "Elementary Mechanics of Fluids" © 1946 pp 170–171, 254–255, 288–294 ISBDN 0–486–63699–2 © Dover Books, © 1978, USA.

C. A. Marchaj, "Aero–Hydrodynamics of Sailing", © 1979 pp 131–140, 205–214,253–254,291, 353–381 ISBDN 0–87742–993–6, Intnt'l Marine Publ., USA.

Uriel Frisch, "Turbulence" © 1995, pp 242, 21–26, 103–106, 184–188, ISBDN 0–521–45103–5 © 1995 Cambridge Press, USA.

Georgi Tolstov, "Fourier Series" © 1962, pp 1–39, 80–91, ISBDN 0–486–63317–9 © 1962 Dover Press, USA.

* cited by examiner

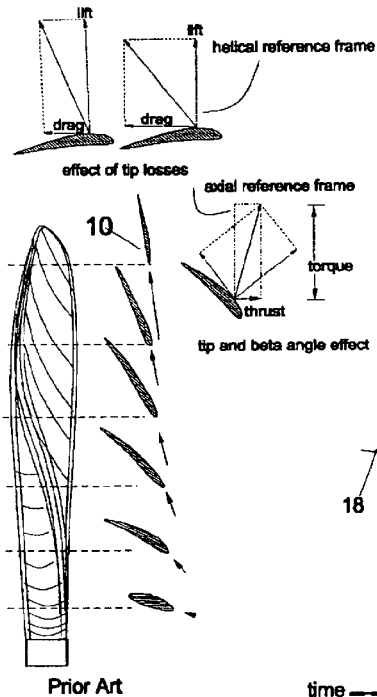
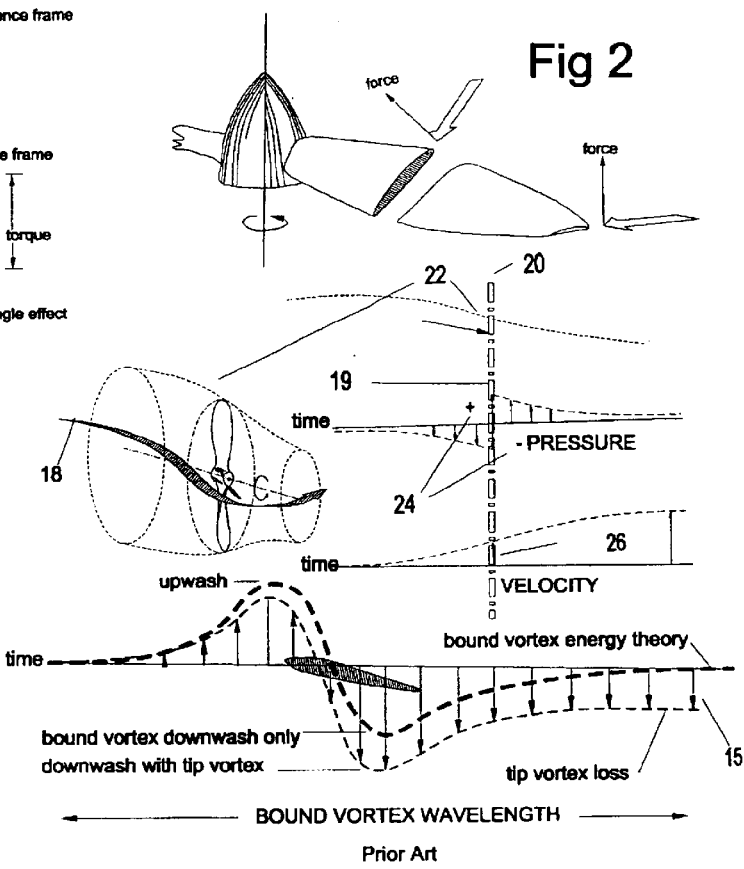
Fig 1
Prior Art
Prior Art
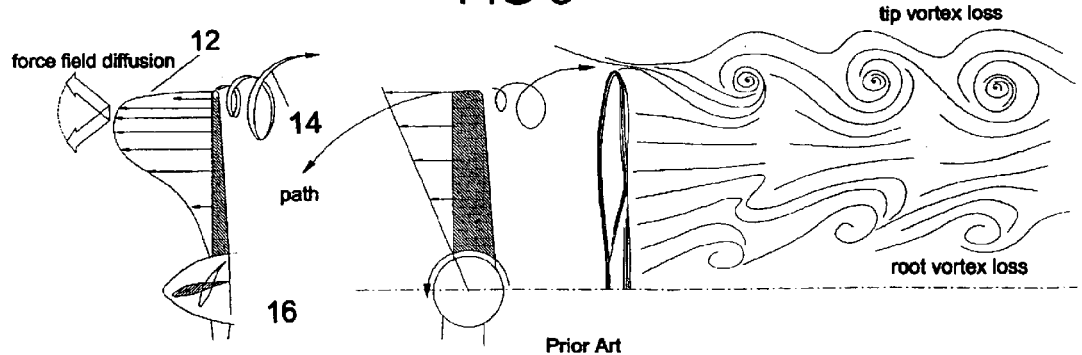
FIG 3
Prior Art

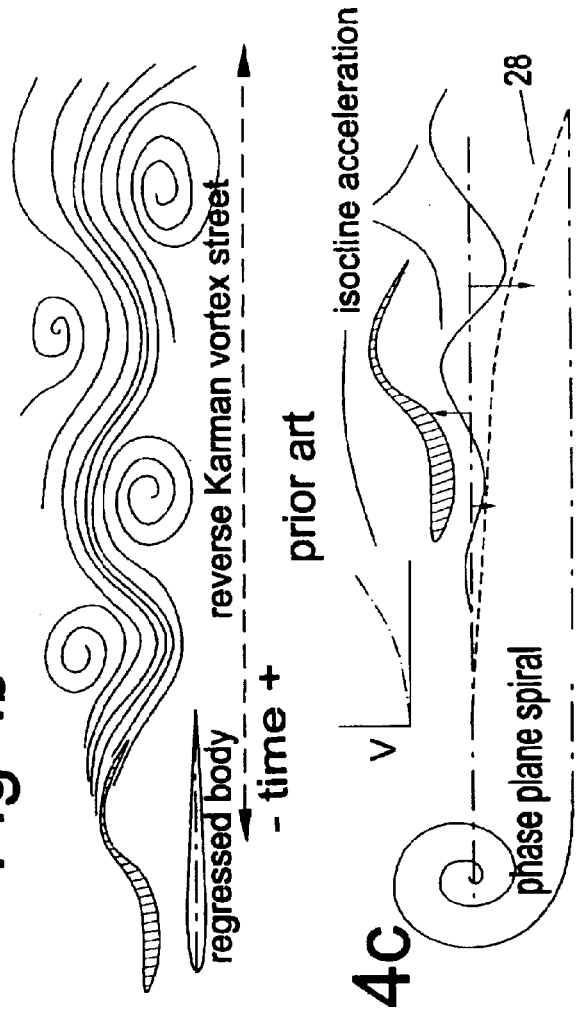
Fig 4a
Fig 4b
Fig 4c
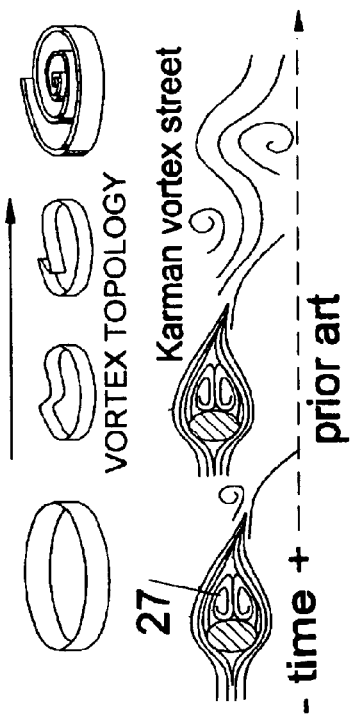
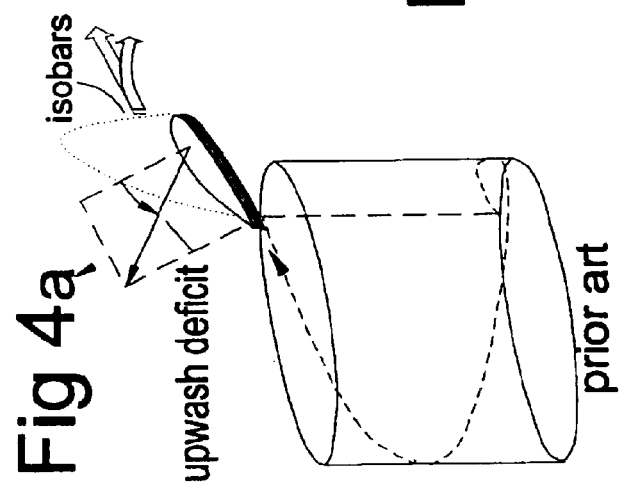
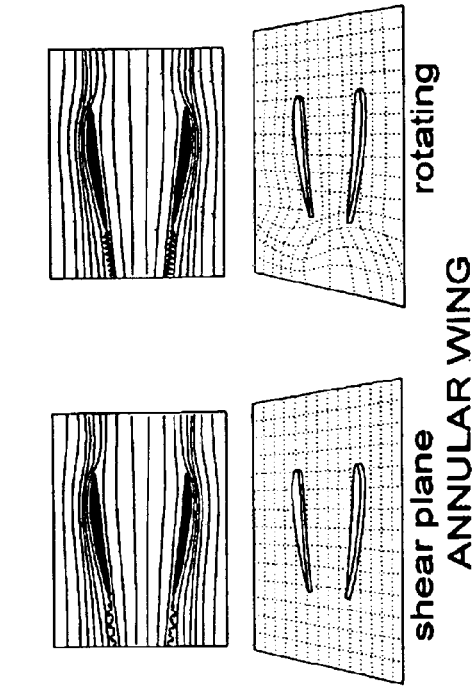
Fig 4d

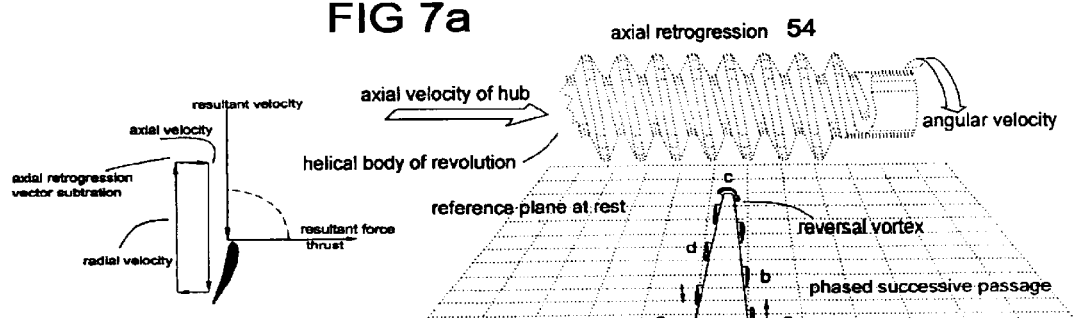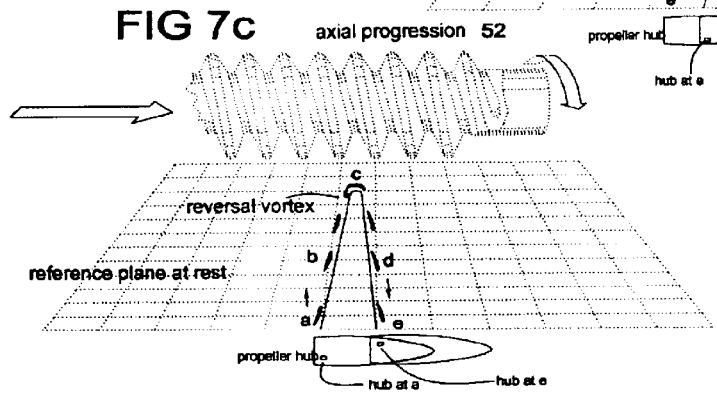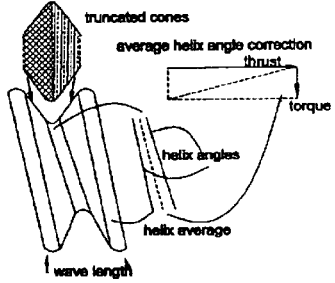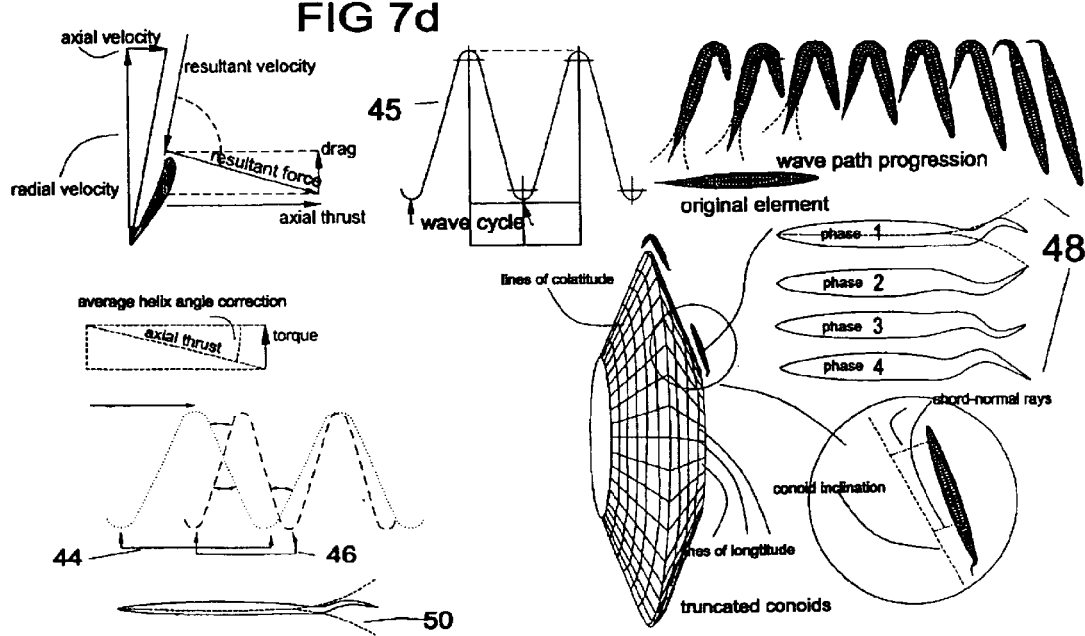

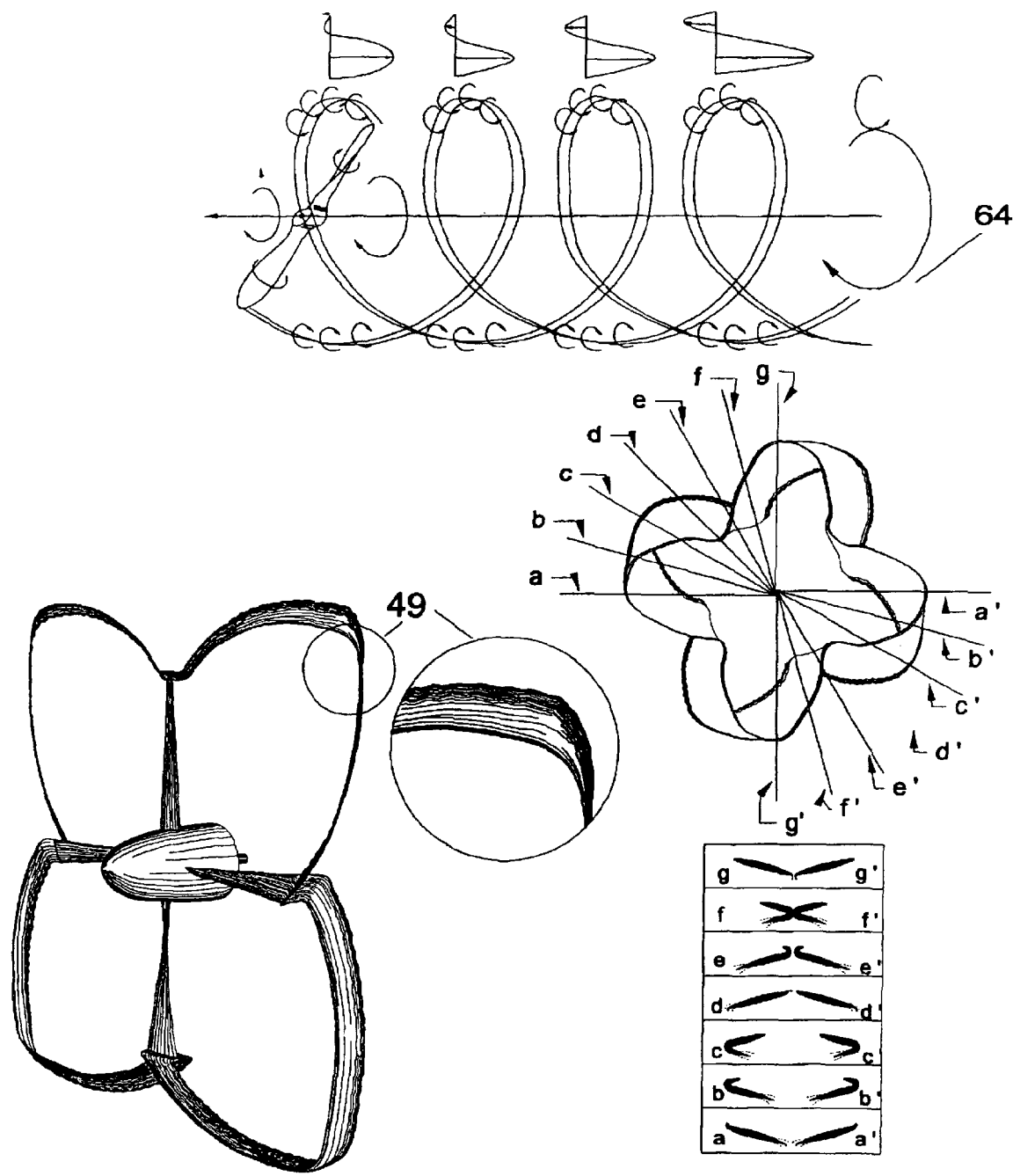

Fig 10
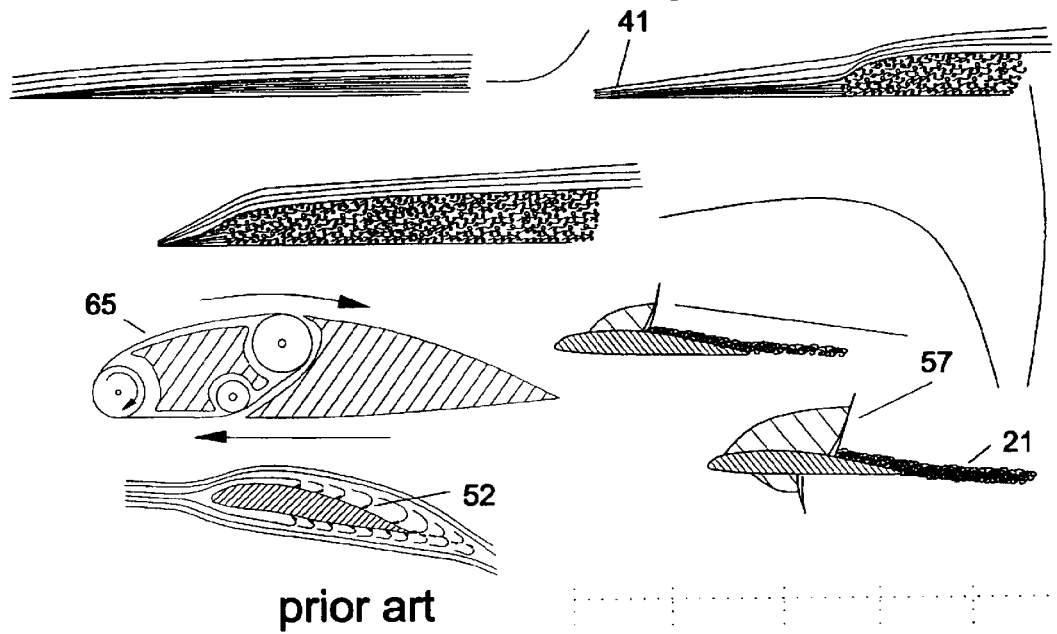
prior art
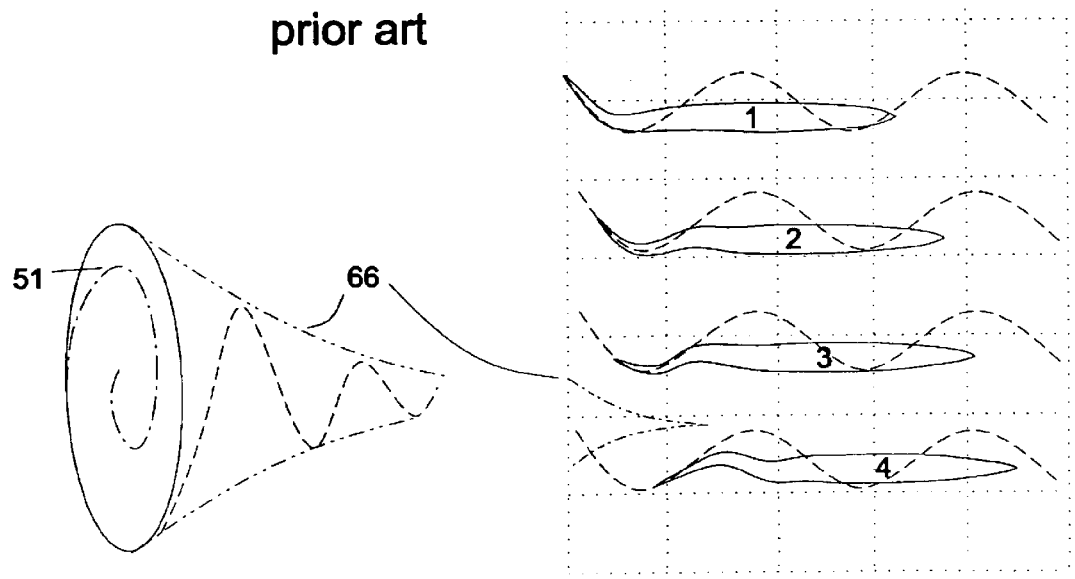

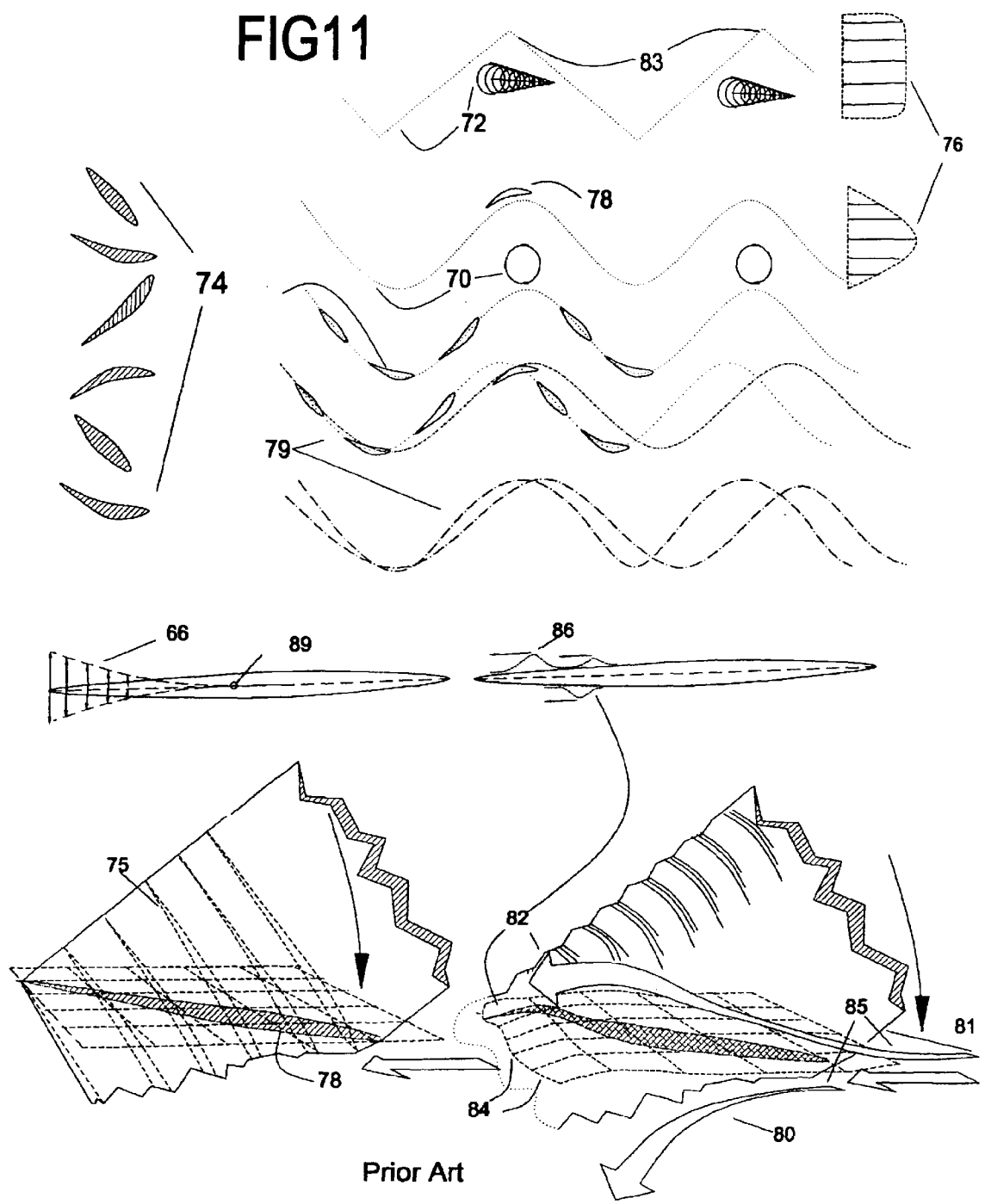
Prior Art

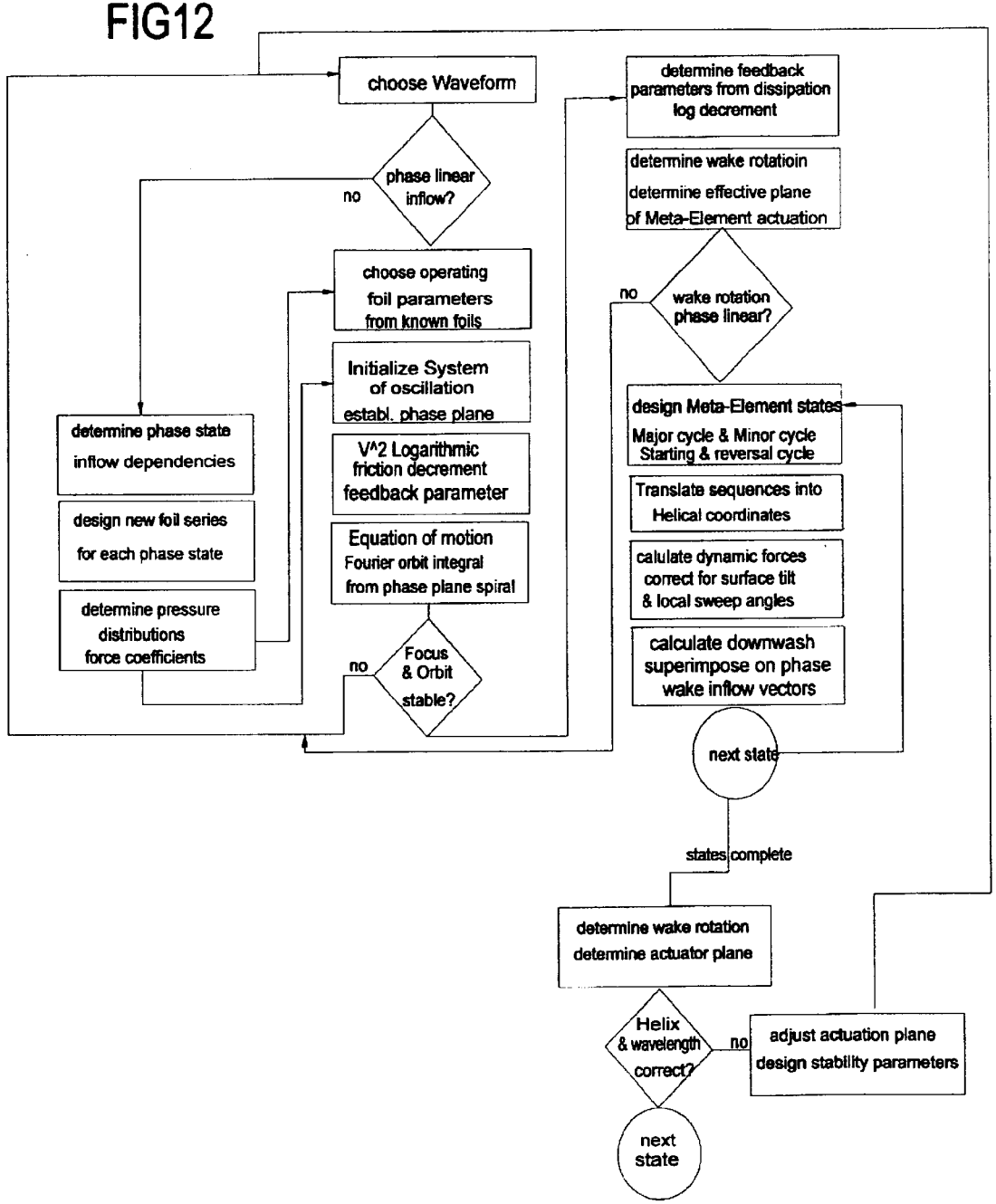

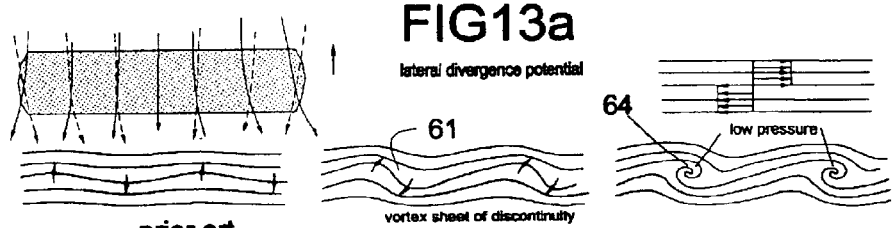
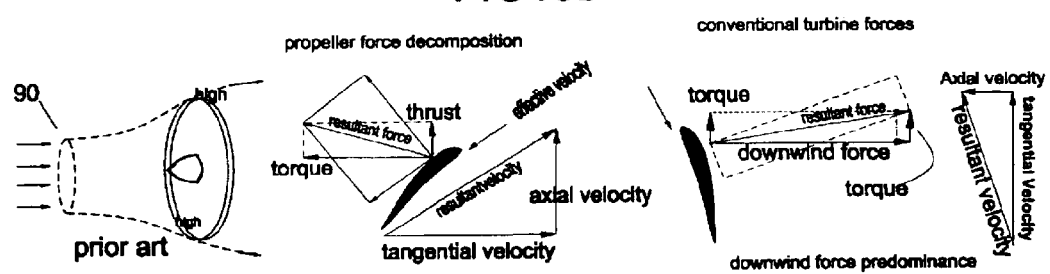
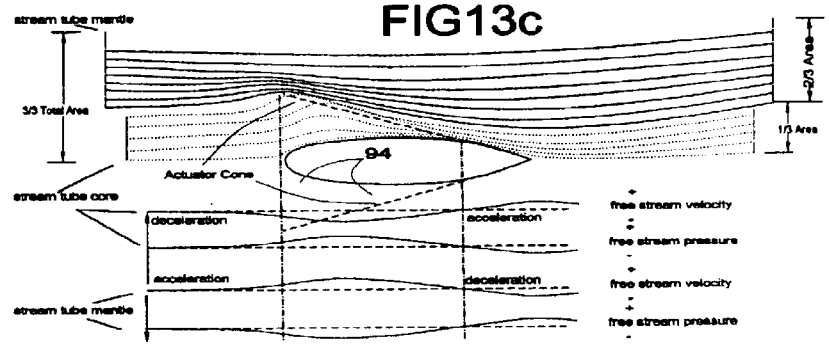
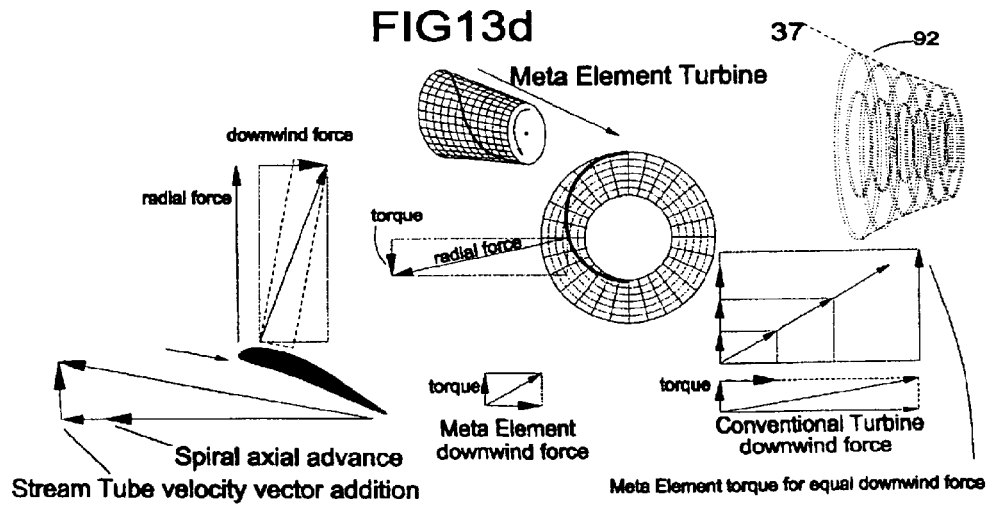

axial plane movement axial plane movement

SPIRAL-BASED AXIAL FLOW DEVICES

BACKGROUND

1. Field of Invention

This invention relates to the field of acceleration or deceleration of fluids using rotation of impulsive or propulsive means to impart or extract kinetic energy. It also relates to the study of animal modes of locomotion using oscillation of, or wavelike deformation of propulsive surfaces. It thus has application to prior art in the field of propellers, impellers and turbines using annular, spiral or ring type impulsive elements. Of particular interest is the following prior art of: Sugden, U.S. Pat. No. 3,504,990; Haussmann, U.S. Pat. No. 547,210, axially elongated helical propulsive and sustaining devices as in Butow, U.S. Pat. No. 1,015,540; Clark, U.S. Pat. No. 3,221,702 discloses means of generating thrust through wave-like deformations of a vehicle body; Ljungstrom, U.S. Pat. No. 1,868,113 describing blade elements deployed along a curve that is substantially a centrifugal catenary.

It additionally relates to the mathematical study of time-based harmonic oscillating systems, as well as to the related mathematical study of waveforms as in the analysis of electronic signals, as well as certain aspects of the wave equation as it relates amplitude, frequency and length of waveforms to energy content in the physics of wave systems. Also of particular interest is the classic scientific literature relating to energy dissipation in oscillating systems: "Theory of Oscillators"-Dover Press- by A. A. Andronov, "Music, Physics and Engineering"-Dover Press- by Harry F. Olsen, "Fourier Series"-Dover Press—by Georgi Tolstov.

Additionally, it relates to the work of several pioneers in the academic study of computational models of fluid dynamics of undulatory and flagellar locomotion, a field of specialization of the study of Biological Fluid Dynamics. The most prominent of these is Sir James Lighthill. His book "Mathematical Biofluiddynamics"-SIAM 1975-examines several concepts that have important bearing on the following methods, in particular his study of large amplitude flagellar hydrodynamics, as well as carangiform and anguilliform propulsion. Also in this context, I refer to the work done by Massachusetts Institute of Technology's "ROBO-TUNA" project that documents the considerable energy savings possible using mechanical analogs of carangiform locomotion.

Finally, it relates to important recent key developments in the study of periodic energy transport mechanisms such as frequency spectra, sub millimeter vortex filament structures, and eddy mechanics in fluid dynamic turbulence phenomena: -"Turbulence" by U. Frisch, Cambridge Press-.

BACKGROUND

2. Description Of Prior Art

Presently all relatively efficient axial fluid flow devices in general use are based on the conventional propeller. All such devices function by accelerating or decelerating fluid mass using blades mounted upon an axis and subsequently rotated. Due to the differences in rotational velocity of blade elements at the differing radial locations of such a blade, various locations therefore encounter flow from various directions.

As is evident in FIG. 1 of prior art, these blades need therefore to be continuously twisted as well as variously shaped along their length in order to compensate for these differences in velocity and resultant vector 10 of the oncoming flow.

The top illustration of FIG. 2 demonstrates that since the resulting fluid force on the blade at a given location is approximately perpendicular to the direction of incoming flow, this twisting results in physical forces whose directions vary in their usefulness in providing the intended axial change of momentum of this fluid.

As shown in the middle of FIG. 3, since in addition to orientation, the force on any blade section varies as the square of the local velocity as well, most purely axial thrust of fluid in the swept disc occurs in a relatively small annulus close to the blade tips 12 where fluid dynamics recognizes unavoidable flows that result in loss of thrust and formation of tip vortices 14 that due to their high transverse velocities, continuously dissipate kinetic energy and physically drag along vortex structures.

As shown in the lower illustration of FIG. 2, since drag due to—and induced by—lift in any tipped foil results in an increase of fluid acceleration—called induced downwash 15—inboard of the tip to offset the pressure lost to vortex formation at the tip, the disadvantageous helix angles 16 of FIG. 3 on the left of the inboard portion of the propeller disc spills significant energy by twisting the slipstream 18 out of desired axial alignment resulting in root vortex losses. This loss is much beyond that of the drag caused by purely frictional entrainment of rotation.

As seen in FIG. 13a, another consequence of the described tip vortex low-pressure wake structures that develop after passage of the foil is the lateral divergence of flow potential between the upper and lower trailing edge, causing flows to deviate toward the lines of very low equipotential pressure of the developing tip vortex behind the tail. As particles leave the tail, this divergent potential causes the upper and lower particles to approach and embrace in a suddenly tightening radius of curvature by way of the conservation of angular momentum. This results in powerfully rotating vortices of path-transverse vector forming the so-called vortex sheet of discontinuity, which attaches itself to the trailing edge via these filaments' commensurately powerful suction cups, dragging some of these structures—and their fluid mass entrainments—along for the ride.

In the case of the conventional wind turbine, the highly loaded annulus 12 of FIG. 3 additionally imposes the characteristic uneven retardation on the flow streamlines on the right of FIG. 3, causing significant swirl and a thick sheet of discontinuity resulting in the well-documented spillage of over half the theoretically available linear kinetic energy.

These vortex flows 14 additionally also have the disadvantage of causing very high tip region spanwise flows and actual reversals of flow as shown on top of FIG. 9 with resulting boundary layer turbulence, loss of lift and low pressures that additionally occasion different design constraints in different applications:

Ship's propellers—high tip velocities causing cavitation in the tip area engendering destructive interblade harmonics, vibration, resonance and blade erosion, appendage and hull resonance Airplane propeller—the propeller is primarily speed limited by the severe drag rise of the transonic boundary layer separation shock wave induced by the tip flows exceeding the speed of sound at even moderate subsonic velocities and occasioning noise and buffet Helicopter blade—even though the helicopter disc is not purely an axial flow device it nevertheless encounters similar constraints: vortex noise, blade slap due to vortex buffeting and harmonic and resonant oscillations due to rapidly changing differential pressures across the disc due to uneven pressure distribution.

Additional important factors that state added sources of loss of efficiency that affect the conventional propeller are:

The inescapable fact that due to said blade dynamics, the slipstream contracts significantly before and after it laves the theoretical disc of actuation—the Froude Disc of Momentum Theory 19—of the middle of FIG. 2 that represents the plane of rotating blades 20. This is seen as a significant inflow at the propeller tip 22, and locally out of alignment with intended axial acceleration. This has the effect of diminishing the size of the effective actuator disc and so decrements the mass that it can accelerate relative to its theoretical value.

Also, since the propeller works by generating differential pressures across this disc area, a sharply contracting slipstream implies lower pressure differentials 24 across the disc than an actuator disc that had means to benefit from or ameliorate such contraction.

Since—according to Propeller Momentum Theory—efficiency is developed, and measured by the momentum change involving the highest possible fluid mass involving the smallest possible velocity change 26, this unopposed contraction—or its expansion in the case of the turbine—, must also be considered a source of inefficiency through the resulting decremented mass flow rate in the conventional propeller.

An important structural limitation that results from this blade fluid dynamic that detracts from efficiency is the fact that structurally, a thin, twisted rotating bar of relatively flexible material somewhat akin to a single prong long tuning fork—of low natural frequency—, has low resistance to Coriolis forces, disc loading asymmetry, torsional, resonant and harmonic oscillation and so needs a massive and fluid-dynamically inefficient blade root.

An additional fact is that the requirement of adequate starting performance combined with good cruise performance occasions cruise speed efficiency compromises caused by the propellers stated severe design constraints.

In spite of their shortcomings, propellers enjoy the considerable advantage of a precise and repeatable method of design that has allowed a long history of incremental improvement and increasingly high precision of manufacture, in an engineering discipline where minute variations of shape have surprisingly large effects on performance. This method of design represents a continual refinement of theories that have been in existence for most of a century.

One of these theories in wide use—the Blade Element Theory—analyzes velocity vectors and viscosity coefficients of individual blade sections at successive blade radii and computes the entire propellers parameters by summing the individual parameters of these elements.

Instead of using the plane aligned with vectors of predominant flow, such methods model actual blade flows by computed changes of momentum along theoretical tangents to helices inscribed on surfaces of revolution generated by blade element motion as reference datum.

Although no rigorous analysis of actual three-dimensional vortex formation is made, a well documented database of empirical values for secondary flows provide the correctional factors that enable today's high correlation of theoretical and experimental values.

Importantly, these theories work with assumptive linear and statistical parameters of free stream velocity without a time-based rate of change reference frame.

These methods assess theoretical conditions of statistical, time invariant steady-state lift on rigid foils that move along helices in Euclidean space as shown in FIG. 4a.

As consequence of this, the vector and time coefficients of the Impulse—Momentum Equations of Motion—, which the equation of Blade Element of Lift does not formally treat, except for an invariant velocity of inflow—introduce highly skewed inflows in the case of rotation.

As is depicted in the lower illustration of FIG. 2, bound vortex upwash is a function of time. Its prerequisite—the acceleration of fluid mass ahead of its path by the strong attractive force of its low-pressure isobars of potential is normal to lines of equipotential pressure as shown in lower left of FIG. 3. Because this force is a vector, rotation, which can only affect regions of fluid mass over a diffusing sector, involving the rate-of-change tangent-sector of the swept angle of tangential motion, this helical path must itself also be considered a source of propeller inefficiency. According to Newton's second law, a given change in momentum due to any given force-vector is a function of the relative duration of this force. The described sector of diffusion attending rotation must therefore have weak axial stream-tube-relative influence, compared to the steady duration of linear axial-plane motion.

A propeller blade section low-pressure force field of curved path of the lower left of FIG. 3 has not had time to accelerate the actually encountered incoming fluid particles as it diffuses the influence of its low pressure isobars to particles along the diffusion-arc of the changing vector-tangent of its curved path, to particles outside its path, particles that it will not actually encounter. Rotational devices that don't compensate for this curved path must therefore experience a deficit of inflow velocity and weak upwash as shown in FIG. 4a and therefore must be assumed not to benefit from the early phases of the upwash/downwash cycle of what is, in effect, a special wave system called the bound vortex. Such devices accordingly must operate in their own downwash, behind the wave crest.

To crudely illustrate schematically these implications' bearing on the relative efficiency of helical versus linear motion on the basis of glide angle, sailplanes with their slender wings having a nearly horizontal glide angle, even the Space Shuttle with its delta planform and high tip losses at 19 degrees glide angle is more efficient than the streamlined helicopter with a steeper autorotation descent angle using foils that are even more slender than those of sailplanes.

To sum the described deficiencies of rotation itself, partly owing to the continuing inscrutability of the phenomenon of turbulence, and partly due to the millennial legacy of rotation itself, is the practice of this art presently not well integrated with the more evolved time-domain practices in related fields that successfully apply the laws of physics of waves and oscillating systems. As a consequence, the just described inefficiency of helical motion artifacts and tipped-blade vortex that limit economic cost-benefit has been generally considered unamenable.

Due to sum of these well-documented disadvantages attending rotation, there have been many attempts to introduce devices to the marketplace that deal with one or more individual symptoms of the described problem syndrome. Among these are strategies to eliminate tip losses through blades forming centrifugal catenary half-loops, or to simply convert rotary motion to linear motion through rotor blades in the shape of segments of spirals, using the property of the boundary layer that can obscure the resulting 'virtual' motion's different flow directions via the many thin lubricating layers sliding over each other. This would be analogous to a rotating spiral worm gear that can transmit linear motion to its conjugate rack, as shown in FIG 8e. Others have attempted to prevent spanwise flows through chordwise corrugations parallel to flow in an attempt to prevent the lateral divergence pre-conditions of vortex development.

The subject of this document incorporates similar strategic synergies among others using tools provided by several modern time-domain disciplines. In addition it employs direct means to amend the phenomenon of the highly pulsating and directionally disordered reaction mass of the wake that all of these devices are subject to, and that according to the equations of motion, must be considered a measure of lost linear momentum, To explain these strategies and their indispensability to these proposed devices, I now provide a brief overview.

Time-invariant methods of analysis are particularly ill adapted to analyze forces resulting from unusual—namely linear wave propagation—anguillar propulsive mechanisms, particularly those of nature. Here all such mechanisms involve time-domain oscillations and flexing of propulsive elements undergoing variable rates of change. Such rates of change become evident when sectioned by reference planes aligned with their primary axis of motion, and normal to their transverse undulations as shown in FIG. 4b. This motion can be analyzed by comparing the time-regressed body outlines to time-samples of body-relative isocline acceleration and traveling inclined plane maxima as shown in FIG. 4c. Such motion promises high efficiencies, as carangiform swimmers have been clocked at velocities that theory predicts to be unattainable for them.

For lack of comprehensive tools, however, previous attempts to introduce mechanical analogs of such promisingly efficient motions of nature as propulsive devices to the marketplace have suffered from inadequate precision of analysis, thus predictable manufacture, and have—so far—have been commercial failures.

As a three-dimensional secondary flow with its many degrees of freedom is at present treated as heterogeneous turbulence by accepted practice, translation, sliding, flexing and undulation are also not rigorously modeled to acceptable standards of engineering practice. The economic investment necessary to generate such theoretical models of nature has not yet been generally made available.

Thus, any motion that results in undulation as generated by rotation must involve highly complex compound artifacts involving changing reference frames and boundary layer interactions that pose severe analytic difficulties using state of the art design tools.

Historically, there have been some attempts to introduce devices based on the animal model of locomotion to accelerate or decelerate fluid in the hope to improve upon the propeller. In particular, many of these have attempted to generate relative motions along various versions of the spiral of changing radius. The patents of Haussmann—1895—and Sugden—1970—in particular showed the structural advantages of spiral foil segments joined at their tips.

Such devices, especially the Sugden device promoting 'undulating flow', claimed to demonstrate improved efficiencies in comparison to the propeller.

Such devices in rotation, however, use:

Constantly changing foil profile elements

Constantly changing foil geometry like camber, length, thickness,

Continuously varying rate of change of lift coefficient, (angle of attack)

Continuously shed vortices attendant to such change in angle of attack

Constantly changing compound sweep, and high spanwise flow

Constantly changing flow directions not aligned with a surface of revolution—the theoretical plane of analyses—

Constantly changing boundary layer differential shear with vectors not aligned with the primary dynamic flow field, Constantly varying viscosity coefficients, Rapid reversal of motion, Rapid reversal of wake vortex spin direction (Karman Vortex Street)

Rapid alternation of lifting surface orientation to the flow field,

Rapid reversal of flow direction

Rapid reversal of bound vortex spin direction

Rapid reversal of lift circulation co-efficient

As this latter parameter is the very basis of the classical theory of lift, any design that cannot—due to these imponderabilities—predict inflow vector, cannot determine this circulation or the force of lift, or drag.

Flow is by its very nature evasive and turbulence cascades down to infinitesimal time scales. The possible interactions with it—and possible unintended consequences thereof—are infinite. Therefore this massive analytical overload must be simplified by designing a process that is understandable to the existing tools of analysis. The main tool, Blade Element Theory, must be given reliable inflow, viscosity and blade profiles of known parameters. If lift cannot be determined, foil orientation is not precisely possible. Without formulated precision of causal relationships, repeatable effects became difficult to achieve.

Since some of such devices proposed to benefit from undulations of reaction masses however, they must be presumed to experience undulations of time-domain inflow vectors that demonstrate continuous rates of change of kinetic and potential energy. Without a fully rigorous fluid dynamic modeling of such flows—still out of reach—, relative motion could not be determined. Such devices' orientation to flow and thus pressure gradients could not be ascertained to satisfy the Blade Element Theory requirements as well as standards of manufacturing repeatability.

Without time-domain inflow parameters, such attempts were limited to intuitive experimentation on the basis of trial-and-error and as commercial devices could not hope to compete with the considerable empirical theoretical database of a highly refined engineering practice benefiting from many decades of incremental data refinement.

And yet, accurate velocimetry analysis as to the effect of time-domain and boundary layer phenomena have been available in the field of Biofluiddynamics and certainly do now exist. Recent government sponsored university research advances in the field of mathematical biofluiddynamics using high-speed video image Digital Particle Laser Doppler velocimetry provide a relatively accurate model of the boundary layer, mechanics and vector fields of time-evolving vortex dispositions of animal undulatory expanding wave locomotion. To make a computational model of such motion, all that is additionally needed once viscosity and thus shear-drag is determined, is wave mechanics itself to relate energy content and orbital inflow.

Thus experimental computational three-dimensional vector-field animations of fish propulsion have been, and are now widely available.

If such insights into the vector field dispositions and boundary layer ejection mechanisms enabling aquatic creatures their extraordinary reductions of form drag and paradoxical speed/power relationships could somehow be practically applied to the rotational mode of operation, then my primary avocation, namely that of creating efficient wind power devices, might benefit from the prospect of recapturing some of that half-portion of linear momentum that is presently made unavailable using conventional means.

With this prime aim in mind, I determined to examine the axial shear-plane-relative motion of rotors made of wave-cycle profile sequences arrayed around 3D spiral segments, remapped to truncated cones, that act the part of time-domain cams. This is illustrated on the right of FIG. 5c. FIG. 5b shows the enabling lubricity mechanism conferred by the boundary layer that allows axially aligned stream tubes to be relatively unaffected by tangential 'vector shear'.

These path-oriented profile sequences would sequentially progress along a constant angle to this path at constant velocity along both dimensions of the axial shear plane by shearing through all encountered axial planes—and thus any datum reference plane—moving tangential to that plane. They would additionally eject boundary layer accumulations by creating high-rate expanding-wave anguillar propulsion through the effect of the rate-of-change Inclined-Ramp contour variations that the smoothed after-body profile sequences transmitted, as they transited the shear plane. By varying the spiraling rotor 'blade' as a whole by such parameters as profile length, radius, angular velocity and axial and radial advance, it would be possible to achieve structural load paths embedded within this rotor 'blade' that came close to the structurally advantageous centrifugal catenary curve. Thus, the analytical imponderables of undulation of inflow and reaction mass, as well as the time-domain effect of unknown profile-section change sequences of unknown parameter would simply be bypassed, allowing a systematic periodic function based progressive remapping of a single published profile, which can, over a single wave cycle, be deemed regressed—and thus in its effect equal to—to its published coordinates and thus performance curves.

Because this concept seemed also to contain disquietingly paradoxical, and even mutually exclusive operating modes, namely that a rotating device, while imparting angular momentum, should at the same time be one that guides and benefits from a bound vortex wave system moving along straight lines, I proceeded to the create the bridging concepts, computer models and finally actual devices to convince myself that rotation can indeed, produce linear bound vortex pressure wave motion substantially parallel to the axial shear plane, as long as the velocity vectors along this plane are greater than that of the engendering local tangential velocity of rotation.

I also established to my satisfaction that—in the case of such motion and adequately high Reynolds number—simplifying the tangential shear effect of the multiplicity of incoming axial stream tubes to a single schematic axial shear plane provides the bridging concept enabling a good predictive Blade Element-Theory based correlation with the measured flow of actual devices.

Accordingly, I will now outline the advantage of these bridging concepts.

The Proposed Invention as an Advance in the State of the Art

These devices propose to advance the art of extracting momentum from—or imparting momentum to—axial flow, by ordering the directionally chaotic and pulsatile reaction mass of the wake of current rotational and spiral-based devices using several synergistic strategies, each of which are of advantage in analysis of spiral-based devices operating in the time domain. They depend on the two main enabling phenomena. The first is the lubricity of the many layers of fluid that cling to any dynamic shape called boundary layer.

As is shown in FIG. 5b, any embodied fluid dynamic shape—here a spinning saucer shaped toy disc that provides lift is accompanied by a field of flow streamlines, that delineate local fluid motion. The main features of this vector field are:

1. The dynamic flow providing the pressure differentials that generate useful forces
2. The frictional adhesions including standing vortices 30 entrained by this body
3. The roiling vortex wake representing the lost frictional energies that represent the cost of sustaining such motion.

Surrounding this body is an exceedingly thin membrane 31—the boundary layer—. This layer enables a kinetically economical passage for that vast majority of much faster particles of high kinetic energy making up the 'dynamic flow' that is the actual generator of the pressure differentials that create useful forces.

This phenomenon is illustrated by the flight of the tossed and rotating disc whose dynamic flow field is here illustrated. Even though most of its surface is moving in directions at variance with the path of its flight, the phenomenon of lubricity-masked directional boundary layer 'vector-shear' nevertheless enables the characteristic dynamic flow field that enables all linear dynamic flight, that results in its amazing feats of stability and length of flight.

The second phenomena that enables this phenomenon for this toy disc—or any-devices that rotate in order to impart or extract momentum, is the overwhelming collective enmeshed inertia of the continuum of axially aligned mass flow that shows quantifiable resistance to being tangentially twisted as a result of the rotation. This resistance itself enables analysis along reliable helices of relative motion of FIG. 4a in conventional devices. This fact allows the collective multiplicity of coaxial planes of motion to be reduced to a single theoretical Plane-of-Shear through which all these devices—whether conventional or not—must, by definition, 'shear through'. Therefore:

1. In order to function as an improvement over propeller-based devices, any spiraling or catenary-loop shear device must first be able to specify the amount of shear plane twist the device is expected to generate, lest inflow vector becomes indeterminate. For this, conventional Reynolds number-based practice, using the three-dimensional Galilean form of the Navier-Stokes equations serves to estimate total shear stress influence on this plane, its cost in turning moment work and resulting tangential motion of the reaction mass. This form of the equation offers implicit compensation for differences in boundary layer vector that translate these to a helically oriented velocity gradient resulting in a 'stress' coefficient within the boundary layer itself. This is illustrated by the left sequence of FIG. 4d. As the Navier Stokes equations confine themselves to measure velocity-gradient-based momentum transfer from layer to layer of this thin lubricating envelope, and the final outermost layer must therefore be presumed aligned to the dynamic flow, the cross-section of the illustrated annular wing with its dynamic flow streamlines would show no difference between static and rotating states—by hypothetical frictionless means—except for the shedding intensity of the trailing vortex system, as intra-boundary layer particles experience a greater path length, mixing length and momentum loss. This lost kinetic energy must be borrowed from mass-momentum of the energetic outer layers. This borrowed extra mass accumulates, now having lost momentum, and is episodically ejected at the tail into time-topology vortex structures that reflects this longer path length coefficient. The work of turning has thus been transferred to the boundary layer in the form of minute polarized angular momentum, which is 'spooled' in a topological sense into asymmetric counter-rotations of a Karman Vortex Street with slowed central flow. Thus, according to classical theory itself, dynamic flow streamlines lack a direct mechanism to make them stray out of alignment with the axial plane before the trailing edge. As experience with this configuration shows, however, that the wake does in fact twist in the direction of rotation, this entrained, now co-rotating vortex sheet must be implicated in this twist, namely by the secondary momentum transfer of the velocity-gradient-based mechanism of this same theory. The vortex sheet is deemed 'attached' to the trailing edge and rotated along, importing momentum from the energetic interface and pulling and twisting this flow—and thus the shear plane itself—through the same momentum transfer. Thus, for any shear-plane-active spiral devices to offer any advantage at all, they must first address shear-plane-distortion by detaching this vortex sheet. This is the central strategy of the proposed class of devices. Thus the prime enabling mechanism of the device is the detachment of this 'drag' entrainment through shape sequence anguillar propulsion.

2. Compound and variable planform sweep of the rotor 'blade'—as imposed by the embedded 3D spiral 'time-cam'—imposes well-documented disadvantageous spanwise flows and high form drag at economically useful lift coefficients that would negate much of the theoretical advantage of the proposed devices, impose high rate-of-change variations in circulation and lift and thus create unacceptable boundary layer turbulence drag as well as a low lift curve slope. As these phenomena are mainly due to adverse tail section pressure gradients, I determined to enlist the mechanism of anguillar propulsion to enforce tail region small-wave chordwise near-wake and boundary layer acceleration and expulsion in order to reduce pressure gradients and enforce axial plane flow alignment. This required time-domain analysis of animal modes of locomotion that involve oscillation using analysis of isocline travel of body wave and surface inclination. This is performed using a datum plane containing the primary axis of locomotion and transverse flexing vectors.

3. This schematic additionally uses energy-content wave equation analysis, the phase plane analysis of oscillations for dissipation and resistance to flow-rate-of-change, or 'hysteresis', and Strouhal number to determine phase, frequency, amplitude and isocline rate-of-change of body sections engaged in wave-like transformations.

In these methods, flexing propulsive bodies including fins and wings are frequency-sampled for rate-of-change differential motion normal to and along their axis of symmetry.

It is the synergy of these time-domain strategies that result in final device shapes specified by time-domain mathematics. These demonstrate a considerable theoretical advance in efficiency.

To specify this advantage I will now compare theoretical considerations of state-of-the-art and the proposed devices' functional basis using schematic and graphical metaphor to illustrate the classical-parameter-relative implications derived from Blade Element and Momentum Theory.

Theory of Operation

Although the fluid dynamic lift equation itself contains no time coefficients—except for inflow velocity—, it nevereless is historically derived from Newton's time-domain equations of motion. This fact has important bearing on the implications resulting from the rotation of lift-producing blade elements.

Accordingly, the proposed devices' design methods re-import time-domain impulse-momentum considerations from these original equations, as the after-body of conventional profiles is presently design-constrained by the need to limit adverse pressure gradients in order to regain free stream velocity and so prevent the spanwise detachment of flow.

In principle, impulse-momentum-based interventions using path-transverse Inclined-Plane-based, body-relative traveling waves—as documented to be highly effective in reducing such adverse pressure gradients in the motions of aquatic creatures—are readily available to re-import energy to this tail region using Inclined Plane space quadrature vector-coupling. These are mechanisms that have analogs in the motion of worm/linear rack conjugate enmeshment that translates rotary to linear motion, where the 'sliding' component of motion is largely eliminated by a suitable lubricating agent.

These devices thus benefit from mechanisms implicit in the Equations of Motion's impulse generating rate-of-change-inclination of surfaces the tangential motion component of which is masked by the path-compensating lubrication-conferring mechanisms of the boundary layer, when computed relative to the axial shear plane.

These mechanisms thus, in effect, duplicate the serial metamorphosis of traveling wave anguillar phased shape change resulting in its well-researched phase-related traveling pressure wave propulsion.

Such serial transformations of a body classifies any such time-regressed section of this body as a "Soliton Meta-Element", a term of convenience that derives from the notion that a physical form engaged in a rate-of-change wave-like metamorphosis has an effect beyond its moment-to-moment aspect of physical undulation but is part of a fluid-wide continuum of self-stabilizing processes, a single wave meta-phenomenon encompassing a fluid-wide system of angular momentum orbital flows.

It can be therefore treated as part of a single dissipative oscillating system, slowly decaying on the time axis behind its origin-of-resonance. Accordingly, rough estimates as to speed, dissipation and energy budget can be deduced from the observed, or desired, coefficients of the wave equation.

Much is not explained by such a view, but being a concept of convenience gives it the considerable advantage of being able to ignore the many factors of mitigation and nuance that have—according to this view—considerably less immediate bearing.

It merely observes the fact that the eel, for example, is seen to proceed at a speed through the water that is related to the frequency and amplitude terms of a periodic function, as well as the expanding amplitude and expanding distances between the body-relative traveling curvature-isoclines of its body coils.

This concept thus provides a crude scheme not only for the analysis of fish and bird propulsion, but any other fluid induced oscillation, including such widely divergent phenomena such as flutter, vortex induced resonance, or any other oscillation of natural flows and their effect on physical surfaces. As shown in FIG. 4c, all such motion is characterized by the rhythmic undulations of form-conferring envelopes and their wake vector fields moving in time with the undulating envelope shapes that give rise to them. All display the characteristic progressive phases of a periodic waveform.

As is well documented by velocimetry analysis, this waveform extends well behind the undulating body itself into the characteristic regions of undulating accelerated—or decelerated—central flows bounded by standing vortices of alternating polar rotations called Karman Vortex Street.

As is shown in FIG. 4d, any fluid dynamic object, whether rigid or flexible, however physically shaped, is deemed enveloped by this time-based periodic fluctuation of dynamic flow. Here the flow has equipped a flagpole with closely adhering standing vortices 27, allowing fast-moving air particles outside this envelope a kinetically economical passage by conserving their momentum through pressure recovery, This results in the characteristic teardrop shape statistical envelope contours of the time-regressed dynamic flow continuum, containing within its borders these lubricity—and shape-conferring secondary flows.

The frequency of flexion of the "tail" of this flow field relates to the resonant frequency and diameter of the flow field (Strouhal number) and fluid system hysteresis, which acts as a kind of 'streamline-inertia', or 'flow pattern memory' of the oscillating system. These interrelationships, along with other factors such as viscosity, govern the observed vortex shedding frequency.

In view of these observations, and without claim of scientific rigor or even denial of the fact that propulsive foils or fins—especially for carangiform propulsion—may well be more significant for thrust as this body wave in linear propulsion, the Meta-Element concept is based on the following admittedly arbitrary working hypothesis:

1. The Meta-Element is defined as the time-average statistical contour of demarcation of the dynamic flow field 27 of FIG. 4d. All frictional secondary flows such as boundary layers—whether turbulent or laminar—or separation bubbles, or envelope shaping standing vortices, are deemed included during a full cycle of major Strouhal-Karman vortex period flexion. It retains data on the Fourier expansion of the periodic waveform for the major cycle. It abstracts energy dissipation—or import—values from the shape of the curve of envelope maxima 28 of amplitude and wavelength expansion terms.

2. It makes an assumption that if the mean chord of such Meta-Element fluid dynamic body envelopes undergo path-transverse flexions of given frequency and wavelength expansion parameters that allows such bodies locomotion—or retromotion—relative to wake vector field dispositions of FIG. 4b of similar contours but different wavelength, then it will be the Phase-Plane-Spiral logarithmic increment—or decrement—parameters of the path wave compared to the body wave that give information on the velocity as well as energy expenditure of this relative body motion. This is a concept analogous to 'propeller slip' and is also shown on the lower left of FIG. 7d.

3. As is well documented in above-mentioned scientific references, these parameters include, but are not limited to, wavelength, frequency, and amplitude of flexion. Since the fluid medium provides viscous damping, the phase-plane orbit of generation of nature is generally shown—but not limited—to be of a family of logarithmic spirals of FIG. 4c for the inertia-bound flexions of nature.

4. Information about body-relative dispositions of viscous drag is also inferred from the parameters of the Phase-Plane-Spiral of wave form generation, which are abstracted from the—usually—parabolic envelope of maxima of this expanding wave 28, as shown in FIG. 4c.

In this way does wave form analysis, and the physics of oscillating systems result in a drag component for the body, or body element. From this, and the other known parameters of viscosity—Reynolds number—, a coefficient of drag is estimated.

Next, a time averaged full wave cycle regression of the fluctuating contours of this dynamic flow field envelope is derived from sampling intervals.

These provides the envelope and mean chord co-ordinates of a theoretical rigid foil element with parameters of drag—or thrust—that can be readily inferred and then be used to calculate the velocity and pressure gradients prerequisite to the calculation of viscous and dynamic forces.

In the case of the desired profile sequence of the proposed spiraling rotor, this hysteresis-based regression concept allows the use of conventional profiles in the public domain, treating the full cycle of transitory phase transformations as a single statistical profile of fully regressed original coordinates, allowing the use of published performance curves. A full periodic function cycle phase sequence is accordingly treated as a single 'virtual foil' element, —a Meta-Element—, of linear velocity and minute thrust, —as opposed to drag—. This is deemed a flexible physical membrane, aligned with axial flow, and gliding along its spiral foil-shaped timing-am and resonator phase sequence, a concept that is shown in FIG. 5c.

I will now describe this method of generating the requisite shape change using the example of a wind turbine rotor 'blade' element.

The coordinates of the physical shape of a full rotor 'blade' are progressively developed by a periodic function-algorithm method that can be illustrated using a graphic analog of this transformation process and shown overemphasized for visual clarity on the left of FIG. 5d. Here a conventional public-domain profile is split into a profile nose, which remains unchanged and a profile tail section, which is transformed into an 8-phase sequence, using wavelength, and amplitude logarithmic spirals of generation applied to isocline acceleration control points on the median chord. These can displace the envelope-shaping chord-normal rays of graphic construction. The ends of these displaced rays are subsequently connected by cubic spline curves. This phase fragment is then mated to the Archimedes Spiral profile nose, which has been plotted relative to the truncated cone illustrated on the top right of FIG. 5c, to result in a 3-D 'blade', missing its tail sections. This Spiral nose 'blade', deemed attached to the surface of the cone, is then rotated by small increment via this cone, and the next—integral multiple—numbered phase fragment is again mated. This is repeated at equal angular increments of rotation of the cone until the entire length of the Spiral nose section has been filled with a multitude of full-cycle tail section sequences. These are subsequently connected tangentially with cubic spline curves, thereby blending their transitions. Upon rotation, the resulting surfaces' tangential motion through the axial plane-of-shear, provide a smooth rate-of-change variation of chord-transverse inclination over the rear portion of the profile, as is shown on the bottom right of FIG. 5d, whereas the axial-plane-relative flattening slope of the isocline parabola provide for the desired acceleration of the body-relative transverse wave.

A full sequence of these phase fragments in its motion through the plane of shear is a Meta-Element as is shown in FIG. 5c. In its effect on the axially aligned predominant momentum of flow, it can be visualized as an infinitely flexible, very thin, but nevertheless physical film—being composed of a slippery membrane of segregated and viscous material—that closely adheres and animatedly responds like a glove to the rate-of-change isoclines of this resonator sequence in its tangential path through this plane. As the resulting entire 3-D spiral 'blade' is attended by this physical film, boundary layer turbulence, profile drag, as well as induced drag is diminished when compared to conventional blades by the propulsion mechanism of anguillar locomotion.

The Meta-Element is thus deemed physical in the sense that it is made up of many layers of physical viscous lubricant matter, reconciling inner tangential to outer axial flows. It is deemed permeable at the back to allow for the expulsion of lubricant accumulations. In the manner of a thin rubber glove it responds to the changing angles of inclined planes that tangentially transition through it, by converting this rate-of-change to shear plane-relative profile-transverse impulses in space quadrature through force decomposition as is shown on the lower right of FIG. 5d.

In this sense, it acts the part of the oil film contact patch of the spiral worm gear of FIG. 8e that converts rotary motion to the linear motion of its conjugate rack, using the same tangential-to-axial motion conversion mechanism. Since this resulting Meta Element motion thus effectively duplicates the mechanism of anguillar propulsion in space quadrature vector conversion, it is attended by the well documented 'reverse' Karman Vortex Street containing the observed central jet and bounding vortices as illustrated.

To ascertain whether this phenomenon is in fact 'real'— and not some form of wishful thinking—, I measured the wake rotation of my physical fan prototype and found that wake rotation was less than the commercial fan it replaced. As the measured wake rotation was very modest, I could conclude that lubricity, the axial shear plane, and the Meta-Element itself are mutually interdependent, real phenomena.

To analyze this configuration in operating mode, conditions of shear drag are first estimated using published data attending viscosity and velocity of flat plate drag. The dynamic forces of profile drag attending this published profile are then used to offset the designed small increment of anguillar thrust and the—very—low induced drag estimates are added. Finally, the lift equation is used assuming axial-plane-relative velocity composed of the vector sum of axial and radial spiral motion components. To this is added the vector component of incoming axial flow. This process is shown in FIG. 13d, where the resulting vector diagram is compared to a diagram of a conventional turbine.

The resulting lift equation-derived differential pressure forces are conventionally attached normal to the variably inclined spiral-derived profile-sequence's surfaces, as is shown in the lower half of FIG. 13d. They are then corrected for their angle of orientation relative to the axial plane to determine the resulting turning moments acting upon the rotor axis of motion. This is also shown on the bottom of FIG. 13d.

Being a device of rotation, however, there is little doubt that physical profile sections must travel in helical paths in order to provide these described—or envisioned—artifacts.

There cannot, by definition, be two dynamic flows, namely one attending helical motion and another as the result of some secondary artifact thereof. This presented a great conundrum in my initial investigations of these devices. I therefore examined the resulting blade elements' relative aerodynamic shape, orientation and velocity vector sums. This is shown in FIG. 6. Each resulting individual profile shape helical section is entirely anomalous, having different values of chord length, thickness, camber and after-body kink depending on its distance from the axis of rotation and the intersected after-body phase range. They were all, however, of recognizable fluid dynamic shape. Moreover, their angle of attack of helical motion was largely self-similar and closely within a range of Meta-Element orientation to axial flow. Their velocities, being the vector sum of local radius rotational velocity and that of axial flow, were however, significantly lower at all radial locations including the outermost in the case of the wind turbine configuration. Based on these facts, I computed a worst-case scenario contribution to—or detraction from—this helical motion and found a largely non-existent contribution to Meta-Element differential pressure and considerable detraction due to form drag.

As only a single field of differential pressure can exist around single fluid dynamic surfaces, and the Meta Element's spiral advance vector-sum-based relative velocity is designed to be greater than that of helical motion, I concluded—and subsequently proved to myself—that the modest adversity attending helical motion of anomalous profile changes does not disable the greatly increased differential pressures and efficiencies of the Meta Element.

To sum the relatively ancillary effect of helical motion on this spiral based devices:

1. The physical device actually shears through the axial plane at linear velocities that greatly dominate helical velocities. Fluid must part around this axial plane progression and create the velocity-appropriate classical pattern of dynamic lift, thereby overwhelming ancillary helical influence.
2. As shown in on the lower right of FIG. 6, during a given time slice, all isobars attending helical motion have an attenuated effect directly ahead of motion, thus weakening inflow and upwash via a sector of diffusion as defined by the helix-tangents swept during that time, whereas linear motion isobar influence extends durably and with relative concentration, thus providing additional reason for the linear motion dominance of influence over helical motion.

Having now proposed the definition of the physical Meta Element and its interdependent relationship with the axial plane of shear as a rate-of-change quantifiable process, it can now export these quantities in a familiar parameter form as bridge concept, or plug-in, enabling use of the classical analytical framework of momentum theory, as well as conventional pressure/velocity oriented tools such as those of Helicopter Blade Element analysis for additional refinement.

To demonstrate the theoretical operational advantages of these spiral-based devices using the parameters of analysis of classical perspectives, I refer to FIG. 13c, which is a 2-dimensional representation of the total streamline flow field attending the spiral 'blade' as just previously described and illustrated on the upper left of FIG. 5c. This is shown as being attached on one end to a body of revolution and on the other end to an annular wing, which in turn is mounted upon this body via tensile spokes. Although only a single blade is visible for the sake of visual clarity, several such 'blades' should be deemed similarly attached at equal angles to provide symmetry. A tower—not shown—holds this rotor assembly and a tail vane—again not shown—allows the axis of revolution to align itself parallel to flow direction and largely prevent wake twist.

Upon rotation, a single Meta Element—as being composed of the slippery, viscous film with which its axial shear plane counterpart has surrounded it—moves as shown along a path that is defined by the radial and axial coordinates of its rotor 'blade's' truncated cone-coordinate remapped coaxial Archimedes Spiral-of-generation. This path orientation is shown underneath the conic spiral of FIG. 5c. As all other co-axial planes and their Meta Elements are simultaneously generating the same orientation, velocity and thus dynamic flow patterns, these multiplicities can therefore me modeled as forces attending a single axial datum plane.

The vector sums of this motion and axial streamline components, as well as the force resultant of this motion are plotted to provide a dear visual metaphor on the lower left of FIG. 13d. This resultant is then decomposed into components of turning moment versus downwind force. These values are then compared with known operating parameters attending conventional turbines in the same drawing. These are seen to generate comparatively large downwind forces. It is seen on the lower right that when compared on the basis of equal amounts of downwind force—called thrust in wind turbine practice—this vector decomposition shows that the Meta Element device, using very conservative values of spiral axial advance, generates several times the turning force per aggregate of downwind force.

As some of these large conventional turbines must be designed to be able to sustain loads approaching a hundred tons, these vector decompositions make clear that they extract a relatively small amount of energy at the expense of relatively great amounts of mass flow linear momentum that they make unavailable to themselves and to downwind turbines.

This in turn illustrates the phenomenon of the upwind and downwind expansion of the theoretical stream tube 90 of left FIG. 13b predicted by Momentum Theory, which limits the amount of energy capture of this stream tube to the well known "Betz Limit" of approximately 59 percent of the theoretically available power attending the mass flow rate available in this 'tube', a limit that has in fact never thus far been exceeded by any conventional device.

To illustrate the Momentum Theory implications upon these proposed devices, I now refer to FIG. 13c, which has re-oriented the Froude or Rankine Actuator Disc 20 of FIG. 2—which reflects the plane of orientation of the swept disc of rotating 'sails' or 'blades' in a usage of convention dating back for several thousand years—into an Actuator Cone of modern duct configuration reflecting the actual swept surface of orientation of the moving spiral 'blades' on the left of FIG 5c.

As—for purposes of pressure-velocity-relation based analysis—the original Froude Actuator Disc is deemed semi permeable and composed of an infinity of rotating blades, so too is this Actuator Cone of FIG. 13c deemed open a the front and composed of a semi-permeable conic membrane—exactly as in the Actuator Disc—that extracts a given quantity of momentum in exchange for a given amount of impulse of turning force. As is seen, its orientation allows a simple flow-net analysis of flows that reflects its property as a duct of fluid continuum, allowing upstream and downstream control volume adjustment and energy conservation.

The resulting low-pressure isobar orientation just outside of the contracting semi-permeable surfaces of the Actuator Cone—as per Bernoulli—Theorem-based derivation—causes the original stream tube core to be enveloped by an additional outside stream tube mantle, which is decelerated by the shallow angle of deflection into this low-pressure region.

This decelerating stream tube mantle's sacrifice to total upstream and downstream momentum loss must therefore be approximately twice that of the sacrifice of the original 'inner' stream tube, as estimated by the relative contribution of low-pressure versus high pressure to the total differential forces attending the generation of all lift.

These two flows are thus seen to be mirror images of one another as seen in the lower diagrams of the diagram of variations of pressure and velocity attending each. They are thus deemed synergetic and mutually geometrically enmeshed.

The Actuator Disc is a legacy concept predating modern boundary layer theory as well as predating Duct Theory of Computational Fluid Dynamics. 'Stretching' it into an Actuator Cone via the rule-based transformations of topology, which recognizes these surfaces to be in an important sense identical when plotted with a stretched time axis, is mathematically defensible and provides considerable theoretical advantage:

1. For a given extraction—or exchange—of momentum, it spreads the deflective impulse of extraction—instead of over the volume of a blade-wide thin disc—to the much greater volume of mass flow exterior to, as well as within this duct of conic shape itself. It also does this over a much longer time, as fluid particles need more time to cross this extractive mechanism as compared to the time needed to cross the thin Actuator Disc. Thus mass-flow-specific impulse, deformation shear and downwind force per given values of power extraction are much lower.
2. In the case of wind turbines, the analytical convention of the Actuator Disc concept itself has imposed a strategy of erecting a massive barrier to flow, which can be up to twice the equivalent swept area of a flat plate. This imposes many tons of blade root and tower base forces requiring expensive means to assure rigidity, resulting in devices whose aspect is industrially stark and obtrusive, provoking proven public resistance to these harsh intrusions upon cherished pristine and pastoral landscape. The Actuator Cone based devices on the other hand, have a very low tower load and so could slowly sway upon slender towers, steered by their tail vanes. Here they would no longer be limited to decelerating a single stream tube, but rather an incoming elliptically expanding funnel of arc of oscillation, involving even greater mass flow and thereby extract more energy. The period of this sway could be coordinated in a networked synergy in the case of a wind farm to allow greater total energy for turbines operating downwind. Importantly, this quaint motion, reminiscent of trees, along with the inherent sculptural qualities and visual continuity of spiral motion might well disarm some aspects of public objection.

To summarize, as Blade Element vector analysis shows, the proposed duct/spiral-based device extracts several times the turning force for a given amount of downwind force as compared to he conventional wind turbine. As the rough calculations using the parameters of Momentum Theory and Duct Theory show, the impulse of power extraction through deflection is transferred to an interlocked stream tube system that involve up to three times the mass flows rates considered by the Actuator Disc.

As power extraction is a relation of impulse to momentum, these devices spread this impulse to greater mass flow rates and do it without the unintended consequence of converting linear momentum into the chaotic angular momentum of turbulence of FIG. 3.

Thus, it has become evident to myself and will also become apparent for anyone who has access to the tools of lift analysis and the flow net, that the Betz Limit—as being an artifact of the legacy orientation of the Actuator Disc and affecting a stream tube of Disc diameter—is not directly applicable to this duct-based device, which should exceed this limit.

As will be shown subsequently, in its function as a device of propulsion, the Meta Element device will demonstrate increased thrust-per-torque and through the ability to tailor resultant forces, will allow operation at flight velocities previously unattainable by the convential propeller by simple reorientation of the Actuator Disc into an Actuator Cone using truncated cones and spiral parameters.

This has now concluded the exposition of the theory of operation affecting the entire family of these proposed devices' common theoretical operating principles. What follows is a more detailed perspective on the theoretical operational aspects of specific applications. To teat these with full justice, some of the same ground must be restated, in order that the ambiguities due to the lack of extensive mathematical format be eliminated as much as possible.

Since the Meta-Element in motion on both dimensions of the totality of axial planes is an expression of a time series waveform with its harmonics that in its operating cycle encloses a volume 94 as shown in FIG. 13c, it opens the possibility of using the normally unavailable out-of-phase potential kinetic energy of periodic harmonic oscillation of this resonantly coupled volume of fluid mass.

This is accomplished by correctly phasing impulse trains from the Meta-Element cascade of successive passage to benefit from the momentum of phase shifted fluid elastic rebound 59 exactly as it occurs in nature, as is shown in FIG. 8e.

FIG. 7d further illustrates tis concept. An incrementally consecutive Meta-Element phase fragment series on the right is designed to follow the contour of a periodic wave. The operating angle at which the Meta-Element meets oncoming flow is thus a function of compound waveform, path wavelength 44, intercepting the shorter incidence wavelength 46.

As it is a well-documented prime prerequisite for the efficient development of high forces that this angle be kept a constant as possible throughout the operating range, these proposed devices make use of a periodic function for a cosine wave that includes an infinity of odd numbered harmonics. As was shown previously, this slope can also be generated by path resultants 45 of a Spiral of Archimedes, when remapped to truncated conoids-of-revolution.

This motion generates constant operating angles of inflow, except at the short reversal sequence, where the Meta-Element 'changes tack', i.e. reverses its orientation to the inflow and generates a vortex of reversal.

The passage of the resulting 'blade' in forward motion can be visualized in its effect on the axial plane of stationary fluid. Here, as is shown in FIG. 7a, any single waveform concavity/convexity forming the resulting time axis topological helix 'worm' rotating forward at axial velocity will stay stationary relative to particles on this plane, while the topological 'worm' as a whole moves forward.

The back-to-back truncated cones, with their spirals-of-generation, are deemed rotationally enmeshed with this single 'worm' concavity as is shown in FIG. 7b. Progressive rotation of these conic spirals generates a stationary conoid convexity relative to this stationary plane. Progressive profile phase elements are plotted as phase angle harmonic integral multiples of the fundamental angular velocity of these cones-of-generation's surface. This sequence is illustrated as axial progression 52 of FIG. 7c and retrogression 54 of FIG. 7a as well as their relative advantages—depending upon application—in the ability to tailor force vector alignments that minimize/maximize torque or maximize useful forces. Since these forces attach normal to spiral surfaces, final vector decomposition must be corrected for the average spiral angle of inclination of these surfaces.

When compared to the conventional propeller vectors in FIG. 1, it is seen that these devices generate more thrust-per-torque by being able to direct greater amounts of final forces in the desired al direction and by apportioning thrust loading 78 more evenly across its swept cones of actuation as is shown in FIG. 11.

1. A full 360-degree cycle thus constitutes a full cycle Meta element
2. An integral harmonic subcomponent of this wave within the frequency range of natural eddy formation—known to fluid dynamicists as Strouhal number—is superimposed in the form of a harmonic sub cycle sequence 48 generated by using a parabolic envelope of maxima 50 for the harmonic component transpositions of increasing amplitude, re-mapping the aft portion of the mean camber line.

Finally the vector-shear based momentum transfer of the boundary layer is computed using flat plate equivalents, or from the equations of Navier-Stokes.

The effect of this momentum transfer on the deformation of the Meta-Element shear plane is finally 'steered' by stabilizing it through the variation of the major out-of-plane force modifiers such as sweep and surface pressure gradient in an iterative recursion.

To explain schematically the advantages conferred by the ability to detach the Meta-Element orbital flow field pressure wave from the underlying physical surface, I refer to prior art as show in FIG. 8.

Here a conventional wind turbine flow field—redrawn from the contours of an actual photograph of the wind tunnel streamlines as delineated by smoke trails—is compared with the flaw field of the Meta-Element based axial plane spiral based system of oscillation.

The conventional air turbine generates power by creating a well documented highly turbulent, noisy field of enmeshed, interlocking masses of turbulent air that counter-rotate 64 in a self-reinforcing system that persists far downstream.

The impulse of blade passage upon the inertially interlocked incoming axial stream tube of initially exclusive axial momentum that generates this phenomenon thus creates an intermittent angular momentum reaction that is related in magnitude to these sharp impulses 58 of episodic angular acceleration of single direction.

The blades of this turbine encounter air that is therefore already in the process of accommodating itself to this rotation in a phenomenon well known to designers of such devices as 'blade cascade interference'. This effect manifests itself in reduced inflow vectors 56. This concept is metaphorically similar to the idea of birds of passage flying in the sinking air of their preceding leader, rather than laterally displaced, in their classic V formation.

Another metaphor would be idea of letting the angular kinetic energy imparted to a rotating toy disc on a string—a 'YOYO'—in the form of angular momentum, to go to waste, rather than use it to cause the disc to climb back up the string.

By contrast, the wind turbine designed according to Meta-Element time series polarized oscillation creates the classic low-turbulence reverse Karman vortex street, the source of the documented unequaled efficiency of creatures of nature.

It accomplishes this by varying the interplay of the major parameters of influence that determine Meta-Element wave period, harmonic overtone, shape, orientation and thrust as well as the boundary layer influences that determine Meta-Element orientation. Finally, it largely neutralizes tangential components of force by using a variety of means to prevent flow excursion from purely axial motion.

The effect of these axial plane velocity and acceleration vectors then attach to the inclined surfaces in the form of dynamic differential pressure patterns that create tangential forces by acting at right angles to the inclination of these surfaces.

Additionally, in this way, does the potential energy contained in the moment of momentum of the oscillating fluid reaction mass become available to the phase-shifted cascade of successive rotor passage.

The benefits of such a scheme is manifold:

1. Fluid reaction masses arrayed in the highly patterned, coherent and low turbulence Karman wave-vortex pattern—as shown in the upper portion of FIG. 8e—are documented to rapidly widen and attenuate, thus involving a higher reaction mass with a lower mass specific impulse, unlike the propellers high specific impulse's counter rotating turbulent wake which forms a self insulating system that continually dissipates kinetic energy and persists in time.

2. A highly patterned system of bi-directional time-series oscillations can be exploded by the Meta-Element—free to move in both dimensions of the axial plane by choosing the timing of succeeding passages to occur out-of-phase 59 as in FIG. 8e—, thus recapturing some of the kinetic energy potential of the oscillating inflowing fluid mass and also conserving more kinetic energy of the air tube as a whole. A similar effect is used in nature by all migrating birds as well as schooling fish that benefit from reaction pressure waves created by their neighbors, as this is a form of 'free' energy. The effect of this for the Meta-Element turbine is a significant increase in torque per fluid momentum loss through beneficially shifted force vectors 60. This is schematically shown in the relatively attenuated wave/vortex system downstream.

3. Unlike a propeller, which imparts sharp, episodic, and staccato impulses 58 on that axially arrayed limited mass of fluid confined to the immediate vicinity of its operating disc of actuation, the Meta Element, in its oscillating motions simultaneously and synergistically interacts with a much greater fluid reaction mass that has been set in polarized resonant oscillation in all axial planes of the azimuth. Thus the Meta-Element device spreads its impulse bad to a much greater mass flow resulting in a smooth, non-pulsing surge 53 analogous to a spiral gear-rack conjugation, when compared to the spur tooth pulsations of single tooth engagement.

4. Finally, a turbine employing a soliton wave engendering Meta-Element progressing axially forward 59—against the ambient fluid stream—will generate significant increases in differential pressure intensities resulting from this vector addition as this wave front 'virtual' velocity will be significantly higher than ambient stream velocities. The resulting higher pressures act on intermediating spiral surfaces and the resulting beneficially shifted force vectors 60 provide greatly expanded torque per given fluid momentum loss, permitting highly unusual values of torque per unit of downwind as well as blade drag.

To summarize Meta Element time considerations:

1. Meta-Element hypothesis conceives of all bodies—whether rigid or not—that are interchanging impulses with fluid mass momentum as sharing contours with a dynamic flow that has the character of a non-linear damped pressure wave system that can be expressed as a Fourier series periodic function. This periodic function includes those harmonic subcomponents that produce the characteristic resonant vortex shedding at the tail. This entrains periodic vertical flexion of the vector field that cycles faster than hysteresis based system frequency response. It views the phase plane spiral curves of this oscillation as an information source for values of body-relative viscous friction.

2. All fluid dynamic bodies are therefore deemed an integral part of a phase locked oscillating system involving fluid masses exhibiting the fluid dynamic equivalents of resistance, capacitance and inductance. Since the particles of such masses move in elliptical or circular orbits, such oscillations interchange angular momentum with such bodies, and thus have mechanisms to conserve this angular momentum. But as is shown in FIG. 13a, since any rigid object—especially a rigid tail—cannot accommodate itself to the high frequency wave potentials of the small waveless harmonic component sub orbits, it develops an interfering phase lag with the prime wave component, causing these disordered high frequency energies to precipitate into rapidly pulsing vertical moments 61 at the tail. This results in the formation of a surface of discontinuity that acts as a barrier to the phase path continuity of particle orbits. Significant high frequency components of angular momentum of the bound vortex are discharged into this roiling surface of discontinuity, creating a highly concentrated area of dissipation through small scale turbulent intermixing. This phenomenon distorts the waveform, and degrades oscillation-rebound-based mechanisms of energy conservation through phased elastic energy recovery.

3. As is shown in FIG. 13a, the conventional propeller is additionally burdened by a secondary consequence attending this surface of discontinuity, as the divergent flows 61 of the upper and lower surfaces fail to rejoin at the trailing edge and so develop distortions of the surface of discontinuity that terminate in medium scale vortices containing high levels of lost energy in the form of moment of momentum.

The wake of fishes is known to contain much smaller amounts of vorticity and turbulence, allowing them their observed unequalled efficiencies. Thus, strategies here outlined include Soliton Meta-Element tail flexion to re-export lost capacitive energies to the flow, restoring the coherence of the oscillating system through feedback of lost short wavelength harmonics.

Meta-Element hypothesis thus sees the induced wake losses of the rigid tail conventional propeller as being the result of an unintended conversion of significant energies of impulse to disorderly angular moment of momentum.

This, in turn allows the coherent wave attending lift to become disordered and so to discharge some of its moment of momentum into a cascade of chaotic flows of decreasing scale. This cascade ends in generating useless heat and sound. In doing so, it also provides a ready escape for the waste of meaningful amounts of kinetic energy that might otherwise remain available.

It is the primary goal of these methods to interrupt this specific causal chain.

These strategies, however, use the momentum transfer of fluid shear props of the lubricating boundary layer as the principal enabling mechanism.

This layer's behavior in flows containing shear-in-vector and turbulence is unfortunately not presently fully modeled by the scientific community.

Thus, the possibility existed that these strategies, however promising, might well lack insight on some unexpected detrimental interactions, and thus unintended consequences.

For this reason I set out to build such a device. I first generated the unusual coordinates of a propeller device by computer program. Because of paucity of means I confined the design to purely radial motion. This design also did not include the harmonic spiral sub oscillation, or axial motion.

However, this prototype construction of an electrical fan using a propulsive element made by these methods showed good correlation with the predictions of this model and provided significantly greater airflow, thrust, flow coherence, less near and far wake turbulence as well as significantly less noise than the commercial fan blade it replaced. Precise measurements of electrical consumption, velocity and near and far wake area show significantly greater mass airflow per torque with a blade not incorporating above mentioned boundary layer scavenging features.

Compared to other axial flow devices, propellers use relatively large and thus efficient impulses on large mass flows of fluid.

The proposed innovation extends this idea even further. It also operates on large masses of fluid. But it operates completely unlike a heavily tip-loaded blade, which intermittently imparts sharp energetic pulses of varying radial intensity to local axial fluid stream tubes and then leaves the locality entirely for the rotational part cycle until its return.

This phenomenon imparts the characteristic clapping noise, pressure pulsations, and vortex formation with counter rotating inner core, induced drag and sharp velocity variations, flow reversals and pressure peaks of the wake.

Thus, the stream tubes proceeding parallel to any given axial plane in the proposed invention constantly remain within the influence of the transiting phase sequence of the Soliton Meta-Element as it travels at constant speed and constant angle of attack. All other axial planes simultaneously experience the Meta-Element in different synergistic phases.

In all such planes, they experience neither the entire absence of the Meta-Element from their locality of influence at any moment, or significant pulsation nor therefore intermittence of impulse, thus generating less noise and compensatory vortex flows.

All other coaxial strata are simultaneously experiencing the Meta-Element in complementary phases traveling at the same speed and angle of attack.

Therefore, all fluid stream tubes in the whole of the annulus swept by the half loop embodying the Meta-Element experience an analogous constant non-pulsating and relatively evenly distributed surge 53 of FIG. 8e.

The previously described deficiencies of propeller devices are addressed by the following schematic of strategy:

1—Using an absolutely even distribution of pressure field propagation velocity of the Meta-Element caused by its Archimedes' Spiral Cam-induced radial and axial excursions—not in the rotational but the axial plane—. A high and even velocity across the axial plane predicts even and correctly aligned pressure loading across most of the annulus, thus minimizing cross flows. Additionally, a significantly greater portion of torque is converted to thrust through the improved resultant vectors in the axial direction.

2—Eliminating blade tips. As is shown in FIG. 8, a given local companion Soliton pressure field constantly follows the reversing spiraling Mete-Element back and forth; it lacks the opportunity to discharge potential energy into conventional tip vortex formation. The starting vortex of reversal 55 that is generated is of much smaller intensity, as the phase shifted successive passages attenuates it Without significant tip vortex formation, less induced downwash wake rotation 64 together with improved element orientation 60 combine to significantly reduce wake corkscrew, pulsation and noise.

Summary of this Compound Motion:

The thin lubricating sheath of the boundary layer combined with the inertia of coherently oscillating flow 'memory' of hysteresis substantially prevents the rotational motion of the catenary half loop embodying the spiral cam and sequence of resonators from substantially deflecting the dynamic flow.

Therefore the Meta-Element presents the inertially dominating preponderance of local plane axially aligned fluid, —itself resistant to immediate angular deflection reaction by reason of its overwhelming inertia—, with the sustained presence-in-time of a moving wave of rarefaction, accompanied by one of compaction, moving along both dimensions of the axial plane of motion as shown in FIG. 8.

To accommodate their passage, axial stream tubes have no other choice but to divide around this phenomenon in the classical pattern of high and low velocity flows that generate the differential pressures of lift.

Since a local soliton bound-vortex wave propagating on the axial plane experiences the transition of successive 'resonators' sliding through its plane as a local moving shape in the process of shape transformation, this 'virtual' shape animated by the transiting wave-resonator-train thus cannot leave its orbitally and inertially coupled axial plane fluid stratum.

Thus, the temporarily contained differential pressures—generated by the high and low velocity stream division—have no opportunity to discharge. This is much unlike the case of the propeller where the containing surfaces—i.e. the open propeller blade tip—suddenly leaves the locality entirely.

Here they can implode into a high velocity tip vortex, precisely at the location where the sudden, explosive appearance of the highly loaded propeller tip is followed by its equally sudden, implosive local disappearance.

As there is no open tip, there are no preconditions for pressure-induced, wasteful, implosive and noisy vortex flows.

The third source of improvement over the conventional propeller based device deals with the phenomenon of the boundary layer itself.

In any foil generating lit, the dynamic flow surrenders some of its kinetic energy to envelop what it sees as an obstacle to its smoothly energy-conserving flow with an appropriate lubricating envelope.

The fluid particles that make up this envelope are few at the nose of the foil and slide over each other in smooth 'lamina' 41 generating low drag as shown in FIG. 10.

Soon however, depending on prevailing viscosity, —through the mechanism of frictional entrainment—these intermix and accumulate to a thick envelope of violently turbulent particles 21 that are continuously losing momentum to heat and creating large scrubbing drag coefficients. The boundary layer export to dynamic flow of frictional drag is thus cumulative and therefore exponentially concentrated toward the tail.

At some point of their passage particles lose enough momentum to lose their resistance to random motion, especially in conditions of low viscosity. Here they start to oscillate and impinge on strata of different energy levels and even reverse their motion, pooling in a time-based tidal accumulation toward the trailing edge.

This phenomenon increases drag through the mechanism of violent vortex-based intermixing of layers of different levels of retardation causing high velocity scrubbing of the surface and thus high frictional drag.

In conditions of high lift, or high Mach number and thus adverse pressure gradients, boundary layer material accumulates on the back of the suction side of the foil and eventually flows backward, forming pockets of accumulation.

This ultimately causes the dynamic flow to detach from the surface, resulting in premature loss of lift, high drag and premature stall.

Even using moderate operating lift coefficients, the wake of a conventional propeller contains a wide band—'vortex sheer'—of this slowed material roiling with spiraling eddies which ultimately rolls up into large diameter tip vortices causing the well documented losses due to induced drag.

The accumulation of boundary layer material can thus be appreciated as among the main constraining parameter of design of all lifting devices. Without consideration of the boundary layer, the practice of fluid dynamics would not be possible.

Thus the very conceptual foundation of the proposed invention's designed mode of operation is the attempt to influence the development and relive extent of this layer. These concepts analyze the relative retardation of this slow moving layer as a tidal flow, as being time based and cumulative.

As shown in FIG. 13c, the proposed invention uses this property of the relatively slow accumulation of such material to advantage by presenting the pervasive low pressure field existing ahead of and all across the entry to its swept annulus area with the rapidly shifting sides—and isobars—of the propulsive element going through its spiral reversals. Rapidly shifting isobars predict less tidal cumulative flow of boundary material, as it is sustained pressure differentials over time that is the prime causal factor of such accumulations.

The underlying physical surfaces sliding through a given axial plane of the virtual element do in fact entrain additional boundary layer particles and thus generate additional viscous drag, but these experience neither steady nor uniformly adverse pressure gradients, as they constantly encounter rapidly changing pressure gradients. This encourages larger regions of laminar flow, which is known to exhibit much lower drag than turbulent flow and can thus more than compensate for the effects of this additional shear velocity.

As is shown on the right of FIG. 7d the traveling wave sequence of spiral corrugations 48 on the after body of the physical profiles, —the Meta-Element phase fragments—additionally impart a wave train of transverse flexion of the virtual element tail section.

They employ that requisite Fourier harmonic hysteresis based wave frequency and amplitude and expanding wavelength that can scavenge such boundary layer accumulation through means of the resulting rapidly traveling pressure wave packets.

They additionally use the geometric distributing action of the high frequency transverse flexion of the tail tip. This deforms the 'sheet of discontinuity' of FIG. 13a into corrugations that help to prevent slowed boundary layer segregation by physically distributing it to larger regions of dynamic flow.

Absent a steady unfavorable pressure gradient, the conditions for tidal boundary layer accumulations are also relatively absent Hence, more lift for less viscous drag.

As becomes evident from FIG. 10, any such boundary layer control—here enabled through the novel sliding interaction with axial plane orbits 51—is known to present opportunities of operating with drag coefficients that can be a fraction of those lifting foils operating with mostly turbulent boundary layers.

Additionally, it has been proven that any such boundary layer ejection—using any available method—allows the generation of unusually high lift coefficients before flow separation. Well-documented experiments with a belt 65 as shown in FIG. 10 moving in the direction of flow, allowed angles of attack approaching 90 degrees before stall.

Removing such boundary layer material by suction 52 has been proven to achieve similar—though less dramatic—effects.

In these here-proposed devices, such boundary layer effect is implemented by superimposing an integral harmonic waveform with an exponentially expanding envelope limiting amplitude and wavelength on the tail section of the Meta-Element. The resulting harmonic wave motion contains specifically tailored energies to overcome expected viscous losses.

This envelope is constructed as s-led by the differential equation governing the term of viscous dissipation phase plane logarithmic spiral. This waveform of exponential maxima envelope 66 progressively affects only the aft envelope median of the Meta-Element as shown in a visually exaggerated schematic in FIG. 10. The actual affected area is generally limited to the aft half chord of the tail section itself.

The resulting hysteresis parameter oscillation harmonic subcomponent results in a traveling ripple 86 of FIG. 11 along the tail of the virtual element 82 at exponentially increasing velocity and amplitude.

This wave thus acts in the manner of a peristaltic pump by creating a traveling pressure pulse referenced to relative Meta-Element chord percentage at a speed referenced to local dynamic stream velocities that forcibly conveys slowed boundary material back toward the rapidly flexing tail of the Meta-Element.

This latter action widely distributes this slowed material to regions of the free stream that have the energy potential to readily reaccelerate it. This effectively thins the wake through four mechanisms:

1—These traveling corrugations of the Meta-element tail section reconcile the boundary layer velocity differentials shown in FIG. 13a involving the upper and lower rejoining streams through their equal velocity pressure wave propagation 2—The hysteresis based high frequency of vertical flexion which attenuates natural periodic eddy formation—at Strouhal Number frequency—by preempting its motive cause, being the progressive accumulation and periodic shedding of slowed boundary layer material 3—The geometrically extended trailing edge with its vertical component of hysteresis-referenced motion—and physical orientation—benefits thrust vectorially from the unequal lateral components of the flows above and below the trailing edge and 4—The extra physical trailing edge length resulting from the spiraling wave train terminating in trailing edge diagonal corrugations enables greater momentum transfer due to a physically wider admixture of the upper and lower flows—as mediated by the longer interface of these rejoining flows of differing lateral and axial velocities above and below the camber neutral axis.

This has the effect of a momentum transfer based substantial interlocking, enmeshing and reconciling of these two flows of inequality of axial and lateral momentum by minimizing and physically disrupting the insulating and separating barrier sheet of discarded highly turbulent lubrication—the 'vortex sheet'—of FIG. 13a that normally bars this re-enmeshment.

This action substantially reduces this thin sheet of wake discontinuity made of shed viscous boundary layer material that normally separates laterally and axially divergent upper and lower flows.

If these rejoining flows have less divergence of axial and lateral momentum, such smaller residual differences will cause significantly less local axially oriented vortex development and its associated turbulence and drag.

Since this is a phenomenon well documented in the wake of fish, such strategies may well also benefit these proposed devices in an analogous fashion.

A further significant benefit is the restoration of the energy conserving mechanism of wave oscillation, which depends on the phase completion of integral particle orbits 72 as shown in FIG. 11 that make up its motion. Since all harmonic wave components of wavelengths shorter than the length of the Meta-Element will be prevented from completing their natural orbits as a consequence of physical passage, only such proposed Meta-Element harmonic flexion can reconstitute these missing harmonic components. Such a scheme prevents the precipitation of this 'disturbance of passage' into the documented disordered flows of chaotic moment of momentum attendant to rigid tail passage.

As this vortex formation caused by vector divergence of rejoining flows is also known to be implicated in tip vortex formation, this method of boundary layer control theoretically affects every term of drag and loss of lift known to the art of fluid mechanics.

Such purposive procedural intervention—no matter what its ultimate degree of effectiveness—agrees well with academic theory that promises—and has experimentally proven—unusually large benefits from any method of removing boundary layer accumulations.

The employment of the momentum transfer of the sliding resonant element train for these novel pressure wave artifacts could not, however, be contemplated by an academic model using rate-of-change invariant rigid foil theory.

Prior art inventions that did not decompose axial and transverse velocity changes resulting from oscillation dynamics into phase plane parameters of wave frequency, propagation gradient, amplitude and envelope analysis, containing rate-of-change vectors, could not promulgate such procedural design elements, nor state their degree of expected benefit.

A shear-stressed, thin boundary layer is additionally less liable to early transition into turbulent flow states as its field of opportunity—large pools of accumulated boundary layer material with low inertia—is smaller.

Importantly, operations under conditions of high lift can be expected to improve dramatically if the boundary layer is given less opportunity to stop, reverse, and accumulate—a primary cause for breakdown of the dynamic flow and subsequent catastrophic stall or transonic buffet. Higher maximum coefficients of lift thus become theoretically feasible.

These procedurally derived shape variations have thus proven to be of benefit in responding to losses caused by phenomena previously thought unamenable in man made devices.

A significant element of advance promised by the design procedures of the proposed invention has to do with the ability of these methods to expressly design pressure gradients into the pressure recovery section of the virtual foil by means other than the conventional variation of pressure gradient, namely by the export of precise quanta of energy into the boundary layer by the exponentially expanding traveling wave 66 of FIG. 11.

Thus, until now, velocity profiles due to after-body shape camber variation and their resulting pressure gradients were the sole means of accommodating primarily boundary layer mediated phenomena.

These boundary layer scavenging methods here detailed now offer an additional technique to the designer of these devices resulting in new families of Meta-Element foil sections characterized by thinner and shorter laminar flow foils, shorter recovery sections, with optimized resulting force vectors resulting in less drag.

Benefit of Solution to Slip Stream Contraction Disadvantage:

Another element of advantage of the proposed invention has to do with the phenomenon of the contraction—or expansion in the case of the turbine—of the slipstream 22 as shown in FIG. 2 that is a source of efficiency losses in the conventional propeller-based devices.

This contraction occasions another loss deemed unamenable through built-in operating properties of the propeller, and yet is partially remedied and so is made to aid efficiency in the proposed invention through the following additional mechanism of benefit, entirely unanticipated by conventional practice:

As shown in FIG. 8, the Meta-Element benefits from a momentary angular orientation 59 to this inflow, due to the physical orientation of rotor surfaces. This benefits the transitioning Meta-Element significantly through the favorably shifted vectors of the contracting inflow providing it with vectors that the propeller discards. The benefit is three fold:

1—The increment of force resulting from the forward axial vector component 60
2—The lessened contraction of the actuator annulus—resulting from rotor peripheral surface orientation opposing such contraction—predicts an increment of efficiency through increased mass flow as well as increased peripheral differential pressures across the annulus allowing a higher ratio of torque to drag.
3—The purposeful containment of differential pressures at the periphery of the rotor by design ameliorates the chief cause of excessive induced downwash and thus high levels of induced wake rotation 64 of the conventional propeller. Additionally, since the small reversal tip vortex 45 rotates in space quadrature, it does not reinforce the comparatively small Meta-Element wake rotation 62, which thus can rapidly attenuate. Thus, the Meta-Element wake contains less wasted energy in the form of useless rotation of reaction masses.

Benefits through axial retrogression: cavitation and transonic flight—:

A further novel element of advantage has to do with the ability to so vary fore and aft deployment of the hub attachment of arched spiral segments 33 of FIG. 5c that the virtual foil of the Meta-Element of FIG. 7c is given an axial progression 52 or regression—FIG. 7d component 54 to its motion.

In the case of a propulsion device, use of an axial retrogression component significantly improves resultant force alignment with the axis of thrust beyond even its existing advantage, resulting in greater thrust for torque.

If the pressure wave propagation can be successfully disengaged from the resonant element train by careful adjustment of the parameters that cause proper Meta-Element axial plane radial orientation and thrust, the highly swept helical element tip sequence will experience apparent inflow neutrality and can thus travel at velocities that would otherwise cause the onset of compressibility phenomena.

As shown on the lower middle in FIG. 10, the compressibility shockwave 57 phenomena are a function of lift coefficient, as the lower surface in the transonic regime remains relatively unaffected.

This circumstance allows significantly higher operating velocities, as the helically oriented physical elements can be designed to experience flow neutrality in this region particularly, deriving thrust from relatively energetic tail sequence harmonic motion involving the relatively compressibility-immune aft foil section.

As forward axial velocity components can substantially diminish, or even actually vanish for the propagating pressure wave, the hysteresis artifact of the Meta-Element can operate in a purposely designed 'virtual' velocity regime, where the wave-front experiences only the much lower radial velocities. Here the actual fluid relative velocity through the modification of the local pressure wave 'virtual' velocity. Flight into velocity regimes previously closed to the propeller thus become theoretically possible.

In the case of a turbine, use of an advancing Meta-Element wave-front axial component results in significant improvements of power extracted from a given velocity of flow through the resulting substantial augmentation of resultant vectors' forward shift as shown in FIG. 13c, allowing higher torque components for a given retardation of flow. This predicts greater percentages of kinetic energy extraction from a given mass flow, using inner rotor counter rotation or a tail vane stator—to offset air steam listing moments.

This velocity and vector augmentation additionally favors power extraction from low wind speeds, as the Meta-Element apparent inflow velocity is greatly increased through the vector addition of spiral axial advance accompanying the Meta-Element As previously outlined, the air mass interacting with the turbine will experience significantly less momentum loss per increment of torque than the comparable conventional turbine through the beneficial redirection of force resultants so made possible.

Benefits Through Actuator Volume Mass Flow Increase:

Any conventional turbine's performance as a device that collects torque in exchange for some of the momentum of a theoretical column of air of rotor diameter extending ahead of it is calculated with a variant of "Momentum Theory".

This theory substitutes a mathematical abstraction called "actuator disc" for the propeller's plane of rotation in order to circumvent the theoretical difficulties inherent in analyzing the extremely complicated interdependence of flows across this interface.

This theory's well proven expression for efficiency uses the geometric size of this actuator disc area together with mass velocity change in an equation that can be summarized as follows:

"The device using the greatest possible actuator disc area to effect the smallest possible mass momentum change has the greatest efficiency".

From this point of view the Meta-Element turbine with its greatly increased actuator disc virtual array 92 of FIG. 13c enclosed in a volume 94 of fluid that counteracts its radial expansion, and thus predicts much higher efficiency from the terms of this equation.

Additionally, as illustrated in FIG. 13b, the column of air approaching the conventional propeller disc with its highly flow retarding pressure distribution, as well as its greater than 'flat plate' form drag co-efficient, must expand to accommodate its severe loss of velocity when it crosses the actuator disc plane.

This causes the effective tube diameter to decrease from its theoretical size identity with the rotor disc so that only a certain portion of the theoretical kinetic energy is actually available at the disc of actuation.

This phenomenon, described by the noted German aerodynamicist Betz in the early part of twenty century, has been a major factor in the so-called "Betz Limit", a theoretical ceiling on turbine performance of a given diameter that has yet to be exceeded.

As becomes evident in by visual comparison in FIG. 13c, here exaggerated for clarity, the Meta-Element turbine, as compared to the conventional turbine—viewed simply as an obstacle to ambient flow—presents a much more fluid-dynamically favorable pressure distribution and aerodynamic shape to the approaching air that combine to favor 'inflow funneling' 37 and allows greater mass air flow for a given amount of flow retarding force coefficient.

This combination of features is designed to exceed such stated previous performance limits.

Additionally, since this proposed turbine constrains radial expansion of the approaching flow by means of such 'Inflow Funneling', it stabilizes any directional wind instabilities—such as yaw—though its negative pressure feedback mechanisms, which act in the manner of an aerodynamic duct.

Such yaw correction ability is of considerable benefit, since the conventional propeller-based turbine is known to severely lag in yaw-response that is known to impose severe performance and stability penalties.

The last advantage of the proposed invention has to do with its shape.

As shown in FIG. 9, an enclosed, highly triangulated rotor shape with its mutually supportive A-frame arches close to centrifugal catenary curvature offers a natural rigidity, comparatively high natural frequency and intrinsic resistance to dynamic, harmonic and Coriolis forces.

It does not need a massive blade root, as it experiences primarily tension throughout its operating envelope. It encounters little bending, torsion or blade tip interference phenomena.

Thus, its design has less need to compromise with structural consideration and can thus be much lighter, thinner and more fluid dynamically efficient throughout its length.

As a water propeller, this design offers built in resistance to foreign object fouling and cavitation without the need to sacrifice any efficiency to do so, unlike the conventional 'weed-less' propeller.

Due to its non-injurious shape, it can be used in certain applications previously closed to open tip propellers.

Additionally, its novel layered manufacturing methods 114 as shown in FIG. 23 allow minute air entrainment to further reduce friction and susceptibility to cavitation.

As it generates very little blade impulse phenomena and so is relatively immune to interblade interference, it can be located closer to hull or appendage, permitting increased diameter and thus even additional efficiency as replacement rotor in existing applications.

Benefits of Unprecedented Scalability and Economic Cost-benefit:

As the wind turbine rotor segments of substantially centrifugal catenary shape display high natural frequency and rigidity, they offer high resistance to strong or variable wind, and tower turbulence. As such 'TENSEGRITY' structures are subject primarily to tensile forces, they can be scaled to unprecedented physical size—and therefore economic viability—.

Benefits of Public Acceptability:

The Meta-Element turbine generates a low, steady, non-staccato noise footprint Due to its unprecedented lift over drag ratio, it operates economically in lower as well as higher wind speeds than conventional turbines. Unlike a conventional wind turbine, which can generate tens of tons upon its blade roots and massive tower, it generates relatively small amounts of downwind force, allowing it to store the energy of gusts in the deflection and energy storage of a slender fiberglass tower. As such motion, as well as that of the restful non-flickering, curved shapes, faintly whimsical motion of its spiral rotor is reminiscent of the motion of trees, so that one of the public-wide objections to conventional turbines' stark aspect of industrial sharp angularity and their overpowering obtrusion upon cherished landscapes may well be moderated.

Especially in its application in wind farms, it makes possible extremely cost efficient, small footprint installations of architectural and sculptural qualities that provide the esthetic value of an organic, natural form of low sound, low footprint, and pleasingly restful motion. Therefore it promises a likelier degree of public tolerance—the documented key to the wide adoption of wind power itself.

These benefits thus offer unprecedented, and—in the light of present and prior art—high cost benefit ratios.

Structural Advantages:

Conventional turbine blades have very low natural frequencies, as they are made of very slender, elongated, thin, unsupported strips of thus necessarily flexible blades.

These are intrinsically less resistant to torsion, experience high bending moments, and thus incur high levels of alternating stresses, resonant oscillations, flutter and fatigue.

Due to their length to mass ratio, large wind turbine blades are thus akin to a very long—and very expensive—resonant single prong tuning forks with intrinsically high root loads, susceptibility to inertial self-coupling and tower resonant coupling instabilities and so present formidable engineering challenges. They have very low angular velocity and so need expensive gear trains with their own elastic modulus and sensitivity to inertial shock and resonance.

They thus need equally expensive measures to compensate—such as upwind operation, employment of expensive exotic structural materials and methods of manufacture, complicated pitch changing mechanisms or teetering arrangements and massive blade roots with their weight and losses of efficiency.

Additionally, such wind turbines are notoriously difficult to control in regard to output regulation or resistance to high or variable winds and must simply be shut down at relatively moderate wind speeds, just when wind energy is most available. Their whistling noise, visual flickering, lack of esthetics, lack of wide public acceptance—and marginal economic basis—has prevented their wide-scale adoption in areas of less than high average wind velocity and low population density.

Thus they are located away from population centers and are limited to the few high wind locations that have adequately low property value or population density.

They therefore impose the additional expense of long distance electrical distribution on their economic cost basis.

Due to these factors—using the aforementioned relatively wasteful and expensive strategies—has a free natural resource of almost unlimited potential for the production of low cost energy that does not generate greenhouse gasses, so far produced only marginal and limited benefit to society at large.

Summation of My Solutions to Present Wind-generation Problems:

To summarize the tangible and intangible benefits of the proposed turbine:

If the world-wide stated public policy goal of wide-scale adoption of environmentally beneficial, cost competitive energy production methods could be viewed as achievable not only as the result of the development of economically successful devices offering relative cost-basis benefit, but also by offering such strategies that successfully address those intangible considerations affecting public acceptance and embrace, then these proposals will be seen to certainly offer improved tangible cost benefit of unprecedented degree.

They additionally offer unprecedented solutions to documented esthetic objection, which affect public readiness to embrace change itself.

They do this by offer a pleasing novel iconography of moving organic forms, curves and spirals that has the esthetic appeal, and soothing physiological impact of colorful kites dancing in the wind. They offer a visual experience that leads the eye along a predictable linear recurrence, non-flickering smooth trajectory, in an unbroken, non-staccato visual continuum. Documented visual mechanisms such as the persistence of vision can encompass such motion as a single unified totality.

As such it will tend to be inherently non-injurious to wildlife, as well as unlikely to provoke the built-in involuntary human physiological responses to the stroboscopic visual flickering of massive conventional turbine 'blades' that whistle the approach of a blade moving at guillotine-like velocities.

If such qualities then help to confer to these proposed wind turbines such unquestioned notorious benefit and lack of controversy as do—for instance—large trees, or equally large physical objects of art, or public monuments of architecture, then these devices, together with their tangible and economic benefits might offer a solution to a presently evidenced intractable public resistance that has—so far—prevented wide adoption of an eminently practical form of energy that is insensitive to supply constraints and price fluctuation.

To Summarize Schematically the Foregoing Background Exposition:

If turbines and propellers of present technology and proposed prior art are considered to be offering methods based on strategies and procedures of generating thrust—or torque—, these conventional methods offer procedures that passively tolerate:

Noise

A severely fluctuating and wasteful pressure field propagation velocity,

Resulting in wasteful force orientation and

High torque for low thrust in propellers—or high drag for low torque in turbines—

High boundary layer entrainment,

Wasteful, turbulent vortex sheet of discontinuity,

Strong, turbulent tip vortex,

Actuator disc contraction, —or expansion in turbines—

Limited lift coefficient,

Early transonic compressibility drag,

Induced wake rotation,

High levels of lost energy deposited as turbulence and noise.

High Cost of manufacture

Low esthetic value

Low public acceptance and tolerance

In contrast these novel concepts offer a methodical procedure of using hysteresis and vector-shear to create axialplane-polarized bound vortex orbital flows through successive embodiment sequences of resonator sequences to create:

Procedurally induced pressure field propagation direction and velocity and low noise And procedurally induced boundary layer scavenging

Objects and Advantages

The entire surface of the earth is bathed with solar energy that averages approximately one half kilowatt for every square meter of surface during daylight. If this figure is extrapolated to the square mile, it is seen that the electromagnetic energy equivalence of over a million horsepower per square mile is unevenly heating our ground, water and atmosphere and causing fluids to continually power our weather streams of diffuse fluid motion at all times. This represents an amount of theoretically available power that dwarfs our total human energy consumption by an almost inconceivable factor.

Most of this flow kinetic energy however, whether in rivers, tidal flows, waves or wind itself, resides in diffuse flows of less than 5 meters per second; flows that present strategies and devices are not able to economically access.

Any society that can somehow find ways to tap this vast potential energy would enjoy an equally vast economic benefit through the drastic reduction of what is in effect an onerous energy tax-impound burdening its entire economic base. Less economic burden would mean deceased dependence on supply reliability, collective competitive cost advantage and thus would also provide the private sector competitive impetus for wide scale adoption. It would additionally provide pathways of reducing international tensions caused by competition for increasingly strained resources. It would engage private economic incentive to achieve universally stated public policy goals of reduced production of carbon dioxide, that have not thus far been achievable neither by edict nor international agreement.

These proposed devices have the provision of such advantage as their prime object.

The key to economically tap the vast power inherent in low velocity diffuse flows is to enable the same kind of efficiencies that allowed Burt Rutan's VOYAGER aircraft to fly around the world without refueling. Such efficiencies are primarily achieved by limiting the intensity of the 'horseshoe' vortex system attending the system of differential pressures that is the very enabling mechanism of all fluid dynamic lift. To the extent that these energy-robbing vortex flows can be minimized, devices of relatively low drag and high lift will result.

Our present wind turbines and propellers are devices that generate very high drag for a given amount of beneficial force. Rather than being high lift-to-drag devices, they generate high drag-to-lift. Sailplanes generate over 40 times the values of lift over drag, whereas in conventional wind turbines this ratio is reversed when downwind force is accounted for.

Conventional turbines function by diffusing flows rather than focusing their energies, rather like a prism that diffuses light rays as opposed to a parabolic mirror or magnifying glass that concentrates them into an area of focus. Large wind turbines generate many tons of downwind force in exchange for comparatively small amounts of beneficial torque. They erect a barrier of discontinuity to what is essentially a fluid-wide energy continuum, thereby creating massive flow evasions, mass-flow spillage through divergence, circumvention and its turbulence. They are thus unable to economically generate power for the overwhelming majority of the population living on the landmass that experiences wind resources that are Class 3 or less.

What is therefore needed, is a class of devices that work to concentrate and focus mass flow rates by strategies that have analogs in optical concentrators, using the Bernoulli equations of duct design to create focused acceleration through gradual Venturi control volume constriction of mass flow rates. Such ducts are the mirror image of efficient profiles of aerodynamic bodies of revolution, which act to conserve stream tube mass flow rate through cogent variation of after-body pressure gradient.

Embodying such mechanisms of concentration, the proposed devices generate low downwind force for a given amount of power extraction. They create a modern energy-conservative permeable duct as defined by the conic surface swept by its highly efficient, slender 'blades'. As these are attached at both ends and thus lack an open tip, they have no ready means of generating a strong conventional tip vortex. This resulting converging duct is essentially a funnel; it enlists the intrinsic tendency of fluid stream tubes to circumvent regions of higher pressure by taking advantage of this evasion's beneficial suction force vectors as it crosses the duct walls and that thereby creates enhanced upwash and reduced downwash.

In this way, previously unavailable resources could become available. Therefore it is my prime object to provide for devices of rotation the very qualities that allow high performance sailplanes their high values of lift to drag.

However, as all devices that rotate blades impose the previously described inefficiencies precisely because of the described upwash deficit caused by this rotation, helicity itself must therefore be transformed to the linearity of relative motion that is the prerequisite to the fully developed upwash attending efficient, fully developed bound vortex circulation. Also, tail-section vorticity and spanwise flow must be minimized through Meta-Element thrust. Unless this is done, the convergent duct 'funnel' surface would become a barrier of discontinuity of helicoidal vortex sheet turbulence like that attending the conventional turbine and therefore unable to function —or be analyzed—as a Bernoulli Equation device.

To summarize the advantages that these devices offer in their application of extracting power from fluid stream, they are Devices of collection rather than diffusion, concentrating the upstream continuum of very large mass flows into small regions of differential pressure waves using the wave system energy conserving mechanism of linear propagation to achieve vastly enhanced power extraction that spreads the deflection impulse and its resulting momentum change to three times the mass flow entering its swept diameter compared to the mass flow of conventional practice. Previous limits to power extraction from a stream tube of less than swept disc diameter, including the Betz Limit, no longer apply to such a duct.

Devices of TENSEGRITY in that most of their members act in tension and thus can provide unprecedented structural integrity per-scale as well as unprecedented economies of greatly reduced structure-cost basis Devices of sculptural aspect, quiet and restful motion and thus well suited as esthetic as well as economic assets for public and private spaces.

Devices of unprecedented cost benefit

It is my further object to make available for use in all axial flow devices the advantages possessed by all spiral-motion gear conjugation mechanisms that is conferred to them by their innate ability to translate rotary to linear motion. As the bound vortex that is the enabling mechanism for the generation of all fluid dynamic forces is in effect a system of waves of rarefaction and compression, and waves—unless guided in cavities—have energy conservation mechanisms that allow them full conservation of angular momentum only when they travel at constant velocity and direction, these proposed devices have as their all-encompassing object to empower rotating devices with the energy conservative efficiencies of high lift to drag linear bound vortex wave front propagation.

These advantages will be seen to provide unprecedented duct-design-based propulsive efficiencies in the area of high-speed flight, enabling higher than turbo-prop economy at turbo-fan velocity with lower noise.

Finally, as the most important of the described inefficiencies and high noise attending propeller-based devices can be ascribed to bound vortex pressures implosively escaping into the wasteful tip vortex and its associated surface of discontinuity helicoidal vortex sheet, these devices have as their object to provide unprecedented efficiency by simply tying the bound vortex 'extremities' together into a vortex ring. As spiral 'blades' catenaries with their ends attached to walls, they can be modeled as an annular wing attended by a traveling vortex ring. A TENSEGRITY annular wing of bound vortex ring, as a Soliton of Conservation of Angular Momentum, provides the theoretically lowest induced drag and thus ultimate values of lift-to-drag as well as the highest possible structural integrity per increment of mass.

If it can be stated that the generation of lift forces requires first the acceleration and then the deflection of mass flow, then vertical lift will be provided most efficiently by the device that generates more lift per increment of induced drag to achieve deflection of higher mass flow through smaller impulse spread over a longer duration. Thus the ultimate logical extrapolation of the lift equation itself dictates an annular wing that provides horizontal propulsion as well as vertical lift, making possible the great advantage of efficient vertical takeoff combined with efficient high-speed flight.

Readers will find further advantages and objects of the invention from a consideration of the ensuing detailed description of the actual key mechanisms for assuring the intended plane of actuation, thus the 'steering' of the Meta-Element, and the detailed description and accompanying drawings of proposed methods, processes and devices.

DESCRIPTION OF DRAWING FIGURES

FIG. 1 shows propeller beta angles and tip loss drag vector of prior art

FIG. 2 shows propeller inflow contraction, and upwash time dependency of prior art FIG. 3 shows propeller force field diffusion of prior art FIG. 4*a* shows upwash deficit of prior art FIG. 4*b* shows Meta Element application to prior art FIG. 4*c* shows Meta Element wave dynamics FIG. 4*d* shows shear plane/boundary layer interrelation FIG. 5*b* shows Meta-Element vector-shear of boundary layer FIG. 5*c* shows Meta-Element dynamics and Archimedes spiral nose on conoid surface FIG. 5*d* shows Meta-Element phase construction and isocline dynamics FIG. 6 shows Meta-Element vs. helical element isobar sector of diffusion FIG. 7*a* shows Meta-Element axial retrogression FIG. 7*b* shows construction of cones-of-generation from wave-function-generated helical body-of-revolution FIG. 7*c* shows Meta-Element axial progression FIG. 7*d* shows Meta Element construction along truncated cone coordinates FIG. 8 shows Meta-Element dynamics compared to prior art schematics FIG. 9 shows Meta-Element sequence construction schematics FIG. 10 shows boundary layer dynamics and harmonic sub cycle flexion FIG. 11 shows Meta-Element dynamics compared to prior art FIG. 12 shows Meta-Element schematic design flow chart FIG. 13*a* shows fixed geometry dynamics of prior art FIG. 13*b* shows Meta-Element turbine dynamics and actuator volume FIG. 13*c* shows Meta-Element turbine duct actuator volume FIG. 13*d* shows Meta-Element/conventional turbine vector comparison FIG. 14 shows Meta-Element water propellers FIG. 15 shows Meta-Element fixed wind turbine FIG. 16 shows Meta-Element rotating element wind turbine FIG. 17 shows Meta-Element oscillating element wind turbine FIG. 18 shows Meta-Element hydraulic turbine river system application FIG. 19 shows Meta-Element hydraulic turbine seashore system application FIG. 20 shows Meta-Element turbine and propeller layered structures

LIST OF REFERENCE NUMERALS

10 velocity and vector
12-pressure distribution
14 tip vortices
15 induced downwash
16 helix angles
18 slipstreams
19 Froude Disc
20 disc of actuation
21 turbulent boundary layer
22 propeller inflow contraction
24 pressure differentials across disc
26 velocity change
27 secondary flows
28 parabolic envelope of maxima
30 standing vortices
31-boundary layer
32 helical resonators
33-spiral cam
34-hysteresis cycle footprint
35-resonator fragment
36 helical physical elements
37 inflow funneling
38 physical element sequence
39 plane of rotation
40 lead element
41-laminar-boundary layer
42-reference datum location 43 Meta-Element stream tubes
44 -path wavelength
45 Reversal or starting vortex
46 -incidence wavelength
48 harmonic sub cycle sequence
49 tail section spiral corrugation
50 parabolic envelope of amplitude maxima
51 phase plane spiral
52 boundary layer removal by suction
53 spiral worm gear
54 axial retrogression
55 starting—or reversal vortex
56 inflow vector force diagram
57 compressibility shockwave
58 impulse intensity
59 phased energy recovery
60 inflow vector shift
61 surface of discontinuity
62 Meta-Element wake rotation
64 conventional wake rotation
65 moving belt boundary layer control
66 exponential envelope of maxima
70 sine wave particle orbits
72 -cosine wave with odd numbered harmonics series
74 prior art shape sequences
75 helically oriented physical sections
76 fluid inflow vector gradients
78 axial slipstream oriented sections
79 phase lag
80 out-of-plane viscous forces
81 sweepback angle
82 resonance cycle pressure gradient wave
83 major cycle phase lock pulse
84 plane of actuation
85 out-of-plane dynamic forces
86 traveling hysteresis-term pressure wave
87 forward motion component of axial progression
88 conventional disc of actuation
89 axis of harmonic component flexion
90 actuator disc
92 Meta-Element actuator volume annuli
94 Meta-Element solid of actuation
96 counter rotating tip generators
98 leading edge cuff
99 counter rotating body of revolution
100 air pump
101 lateral force aerodynamic servo
102 feathering axis servo motor
103 tuned mass balance
104 mixing foil cascade
105 Meta-Element hydraulic turbine
106 vented plenum
108 bi-directional exit
110 variable pitch feathering axis mechanism
111 rotatable variable pitch spinner disc
112 axially oriented stators
114 layer construction
115 air entrainment passage

SOLITON META-ELEMENT DETAILED DESCRIPTION

To illustrate the detailed analysis of out-of-effective-shear plane forces for any wave-based device, I now refer to the bottom of FIG. 11. All such devices create useful forces by.

1. Helically oriented profile sections 75 aligned with known angular and posited, estimated axial velocities, sliding through the axial shear plane, creating 2. Axial slipstream oriented boundary-lubricity-artifact 'virtual profile sections' 78 aligned with the indefinably, but slowly twisting slipstream reacting to frictional and dynamic tangential forces.

It thus becomes the task of analysis to determine the relative predominance and effect of such relative motions, and their fluid particle-relative motion artifacts. As only the precise determination of inflow vectors can ascertain whether the device functions as an helical Archimedes Screw or as a wave device relying on sliding interaction with the slipstream, —or as a hybrid combination thereof—, the effect of the device on the angular rotation and velocities of the slipstream must be determined to at least statistical levels of accuracy.

Unlike the propeller, where such motion is constant, in coordinate frames that are artificially fixed, the wave-based device presents relatively much greater difficulties of analysis of flows that by their very nature vary in three dimensional velocity and direction.

As all wave-based devices moving in fluid should—by definition—ideally cause axial accelerations as a response to their rotation, this analysis must therefore include the effect of blade profile wave-path motion on particle orbits affecting inflow vectors.

Generally, such wave motion may be two dimensional and very slow—as in the meandering of rivers or long wave oscillations of ships, or very rapid, and three-dimensional—as in the resonant motions of hummingbird wings or insect flight—where systems of wave trains create highly ordered energies and particle motions that can be modeled using the differential equations of wave mechanics.

In the case of rotating wave-generating devices, these must generate such undulation of their reaction mass by progressively varying their blade profile shapes along an undulating wave path that they progress along, in order to induce intended undulating accelerations. The difficulty of analysis of this wave path is thus the imprecision implicit in the indefinable twisting of the multitude of axial shear.

Unlike the propeller, which creates motion along helices of a supposed Euclidean cylindrical coordinate system, a wave device must—by definition—create motion along these shear planes whose canonical coordinates are a function of three dimensional particle-velocity inflows, and thus subject to periodic-function-related coordinate translations.

As shown in the prior art of the top left of FIG. 11, blade profile sequences 74 following such a designed wave path, —here a simple sine wave—generating low and high frequency potential and kinetic energies acting with precise regularity only on the time series phase plane—tough not necessarily in Cartesian space—, interact with these energies in a phase related interchange between potential and kinetic momentum to create bound vortex local particle orbits 70. As seen, these reverse polarity every 180 degrees of this motion along with the reversal of the orientation of the profile.

If such motion's impulse-momentum interchanges occur in the proper phase relationships, such systems propagating in fluid become coherent reverse-Karman-vortex systems, where the square law of frictional dissipation causes gradual decay of oscillation amplitudes some interval after passage of the blade.

As all rotational devices creating lift must function by creating and benefiting from bound vortex orbital motion, the problem of analysis becomes similar to the process of phased meshing contact of conjugate gears whose paths of rolling contact is specified by phase related equations of motion.

Thus it is the combined frequency spectrum of orbit of the great mass of particles affected by these time dependant energies that affect the actual fluid inflow 76 of wave-based devices. Different periodic waves thus present different inflow distributions.

These waveforms may be simple as in a pure sine wave, or contain the high frequencies of the harmonic spectrum of complex waveforms 72 here a 'saw tooth' cosine harmonic expansion compound wave.

As the computation of the expected efficacy of any fluid dynamic device has to start with the determination of the fluid inflow paths in order to properly align its working "blade" profile sections with the effective plane of actuation—this ideally being the axial plane in the case of wave based devices—it must therefore take into account these time-based flows, as well as the time invariant Archimedes Screw co-ordinate flows that the helically aligned sections 75 experience simultaneously.

These well-documented facts give an idea of the complexities of analysis facing the wave-based device's basic mechanism of operation, which can be summarized as the difficulties of determining:

1. Inflow vector stability
2. Plane of shear tangential momentum transfer due to rotation
3. Phase lag stability factor As these devices must all function by creating quantifiable and stable states via stable planes of interaction with time-based energies propagating linearly, the momentum import upon this plane resulting from the physical surface's sliding shear force and pressure distribution must be ascertainable, lest this orientation become unstable and the resulting tangential excursions of the plane of shear 84 cause linear wave propagation to weaken or become disordered.

To show this graphically, the greatly abridged sequence of fluid dynamic profile shapes 74 making up the infinite series of continuous variation of profile sections of such 'undulating' devices of prior art that uses variations of a simple sine wave path in order to achieve its goal of reaction mass undulation, any—even small—excursions of the multiple —non-parallel—planes of actuation, the 'axial shear planes', immediately causes a wave interaction with a physical blade element section 74 that is finitely out-of-phase, a section of a contour that is not optimized for the actually prevailing inflow vectors, and fluid angular moments.

Computational Fluid Dynamics has no tools to ascertain these vectors this time. Therefore these shapes must be designed for motion along posited Cartesian co-ordinates paths in time invariant space, rather than the time-attentive orbital flows of the —unfortunately unascertainable—actual local wave particle motion. Therefore all interactions can be seen to exhibit the overwhelming likelihood of developing significant phase lag 79 causing turbulence and its shear-plane deformation in the direction of rotation. As different profile shapes create different shear-plane deformations, indeterminate shear planes cannot be unified to a single reliable plane of shear, making precise analysis on the basis of relative motion very difficult.

If such individually deformed planes of shear 84 move unpredictably along with such undefined sum of drag-caused total twist of the slipstream—as it accordingly must—, the effective wavelength of particle orbits must also change indeterminately, and the efficient mechanism of linear wave propagation must become disabled.

This imposes indeterminably higher dynamic loads on the helical sections 75,

Higher values of turbulence drag and wake pulsation must occur as a consequence. This process then entrains further self-reinforcing feedback cycles of drag-based phase lag and additional helical section load.

As the effort to produce the database of operating co-efficients of efficient families of foil sections can involve man-months of effort by highly skilled engineers, it can be appreciated that the modeling parameters of a single such section—operating in statistically indefinable flows—cannot be easily or economically determined.

As such a device needs a great multitude of such sections for its continuum of motion, its fluid interactions can be seen to be exceedingly difficult to model using the limited conventional tools of fluid dynamics. Thus, any advantage for such a device over the propeller is difficult to state to rigorous standard, as the feedback-based development cycle for such a device is effectively closed.

Despite their stated inefficiencies, propeller based devices have evolved to relative sophistication by offering predictable motion relative to predictable cylindrical coordinates using predictable profile sections. Their commercial success is due to a simple model based on a simple motion involving heavily researched profiles, which allows increasingly evolved iteration based on feedback, in a field of endeavor where the complications of possible interactions very quickly lead to inscrutability.

Due to the foregoing reasons, and despite their promise, wave devices of prior art suffer from an intrinsic lack of predictability due to the mutual interactions of an excess of degrees of from of analysis.

To overcome these difficulties, Meta-Element hypothesis contains:

Means of radical simplification of coordinate relative motion

Means of enlisting the vast performance database compiled for public domain profile sections Analytical methods to determine the influence of wave system orbital flows on the known hydrodynamic influences affecting slipstream rotation.

These latter hydrodynamic influences include:

1. Viscous entrainment of the boundary layer exporting momentum to the dynamic flow 80 at the tail.
2. Tailoring of the tangential dynamic forces resulting from pressure gradients including the effect of sweep 81 dynamic force resultants 85
3. Tail-section traveling pressure gradients 86 affecting tangential flows As the interaction of these influences is mutual and complex it becomes desirable to simplify the degrees of freedom to cull these possible interactions.

As both viscous drag and lift coefficients at defined states of viscosity are available as performance curves in conditions of steady-state flow for published foil section coordinates, it becomes necessary to design wave paths of motion of substantial linearity that in turn generate linear inflows in order to be able to employ foil profile-sections of known parameter. This results in the ability to specify precise shapes relative to a precise frame of reference using mathematic algorithms and enabling feedback-based evolution.

To ensure synchrony of the wave path mediated processes occurring in these different frames of reference, the Soliton Meta-Element method uses several strategies:

1. To 'clock' the energy conserving mechanism of a time-referenced system of oscillation, it creates a process cycle—the Soliton Meta-Element—to induce wave phase lock through forced system feedback by means of major path cycle 83 and minor profile-relate cycle forced resonance pulse 82 attentive to hysteresis parameters of the oscillating fluid continuum.

2. To ensure significant linearity of flow and of 'circulation' orbit momentum, it chooses a major-cycle waveform 72 that provides substantially linear conversion of the combined angular velocities of this waveform's Fourier harmonics expansion to result in linear inflow velocities 76 through the means of the combined orbital motion of a large number of Fourier spectrum harmonic wave components.

3. It imports the well researched mean chords and envelopes of foils of known parameter and disposes them relative to these now known particle paths, using conventional Blade Element theory.

4. To ensure the stability of the effective shear plane, it uses a calculus of variation of known parameters as affect out-of-plane flows, as well as precise Meta-Element tail pressure gradient reductions 86 through a hysteresis parameter based tail isocline acceleration favoring substantial low drag flow.

This latter traveling isocline-based 'Meta-Element tail flexion', as previously described in FIG. 5c is a key device useful for moderating a heretofor-inflexible parameter dictating the limits of pressure gradient to a foil recovery section shape.

By using a period of flexion within the hysteresis 'inertia-memory' response time of system of oscillation, the dynamic effect of all transverse motion vectors of symmetry 66 cancel, and only a phase-lagged traveling pressure wave 86 is discernible to time-based flow. This systematic time series shape change allows for hysteresis-based regression of phased shape change back to the published profile co-ordinates with their known values.

This traveling pressure wave acts to scavenge accumulations of boundary layer material and ensures the precondition of greater extents of laminar flow.

To mediate this process, the Meta-Element implements these functions by two physical devices that—upon rotation—work together to share this division of labor.

1. A spiral cam in the form of a profile leading edge that ensures faithful phased meshing with phased orbital flows as modified by fluid acceleration gradients; that also creates precise profile envelope contours and that—importantly-ensures major cycle phase lock through a highly localized and forcibly clocked phase reversal pulse.

2. Resonant element phased cycle sequences affixed to this cam that restores the higher harmonic wave frequencies damped out by its own passage, by reconstituting them via resonant entrainment as well as by phase locking and rejoining these harmonic high frequency energies to the basic wave cycle. This resonant entrainment also has the assignment to provide small scale impulse oscillating system feedback to offset the frictional dissipative constant as deduced from the phase plane logarithmic decrement of wave amplitude attending known viscous dissipation. Additionally, by providing pressure gradient tailoring through traveling wave tail flexion 82, low friction and steady shear plane predictabilities are maintained.

To summarize the concept of the Meta-Element:

1—It is the statistical dynamic flow contours delineated by the physical boundary layer, it contains parameters of waveform, as well as a coefficient of drag that is designed by these procedures to be 'negative', i.e. that thus provides minute thrust.

2—As it is not limited by inertia, its motions are not limited to those waveforms generating Simple Harmonic Motion but uses compound periodic forms containing high frequency harmonics.

3—As it is defined by the boundary sheath that partitions dynamic flow from its process of shape change, it can be made to parallel any path definable by a periodic function, change shape, disappear as well as reappear to this flow, as well as coalesce into another Meta-Element.

The Meta-Element thus is seen to form a link between the time-series phenomena and the Blade Element tools of fluid dynamics, whose methods operate with Euclidean solids.

The methodology encompassing these parameters of influence is depicted in the flowchart of FIG. 12.

WATER PROPELLER—DETAILED DESCRIPTION

Based on the foregoing methods and strategies implied by the Meta-Element interaction with the axial shear plane, I now detail the design process resulting in the manufacture of a water propeller.

Having chosen a waveform that assures substantially linear inflow paths, the design of the proposed water propulsion device follows a sequence of steps to arrive at a design conforming to the desired specification.

Such conventional locations might include but not be limited to—the following:
Diameter
Angular velocity
Advance Ratio/Pitch
Area
Meta-Element Axial Retrogression
Desired Profile
Boundary Layer Interactions
Hub Geometry
Torque
Slip ratio
Anticipated dynamic forces The waveform and actuation plane stability factors of FIG. 12 are determined. When these are ascertained, the multi-loop iterative design recursion FIG. 12 begins with these steps:

1. Based on the desired diameter, area and hub diameter and length, the anticipated dynamic forces, the radial limits of the annulus of rotation, as well as Meta-Element retrogression are determined to result in a Archimedes Spiral/Screw 2-dimensional wave form.

2. Based on the annulus and torque/slip ratio the number of lobes are ascertained 3. Based on this, the Meta-Element foil selection as to chord length and foil shape is made and the representation of this foil as well as its mean chord is stored as a collection of data points.

4. The waveform is now represented as a time domain equation or a collection of data points. The incidence and path wave differential angles are now calculated.

5. Based on anticipated system dissipation, the logarithmic increment of the transverse harmonic motion parabolic envelope of tail flexion amplitude maxima is chosen.

6. Based on anticipated local flow velocities on the foil suction and pressure side the wavelength gradient of the traveling spiral tail corrugation—or differential corrugations is chosen to effect boundary layer transport.

Detailed Graphical Functional Analog of Coordinate Transformation Algorithm

1. To construct the Meta-Element cycle sequence, the chosen profile section is first remapped as a mean chord with chord-normal rays to locate the envelope coordinates for subsequent shape change. This is shown on lower left of FIG. 5d under the title of "wave length expansion". Next the harmonic wavelength increment is represented by expanding control points along the aft chord, here designated as points "a'–h'" as envelope ray origins. These are derived from the plotted parabolic curve that is defined by points "a'–h'". Next the harmonic amplitude increment is represented as rays, here designated as rays "1–8" under the title of "amplitude expansion curves". Next, these are arrayed in regular angular increments to form the amplitude expansion logarithmic spiral. As is shown in phase 1, the logarithmic spiral center is aligned with the mean chord and all mean chord control points along with their envelope rays, are displaced chord-normal by the chord-normal relative location of their points-of-correspondence on the logarithmic spiral. Now their envelopes are reconstituted by the use of cubic spline curves of interpolation. Next, the spiral is turned by the chosen equal increment and the described process is repeated, until all 2 PI radian phases of the Meta-Element cycle is complete. The foregoing process description of necessity is schematical and devoid of some mathematical detail due to the needs of the presentation format. Many algorithmic variations of this scheme are possible. In particular, the shape variations controlled by the process can be applied to envelope contours collectively, as well as to the individual sides of the profile tail section allowing differentially tailored accelerations on the suction and pressure side.

2. The Cartesian coordinate plane is transformed to the cylindrical co ordinates of conoid(s) of revolution with sides defined by the described more cycle 'equiangular saw tooth' cosine periodic function of full Fourier harmonics. This is shown on the bottom of FIG. 7d with coordinates of co-latitude and azimuth-relative longitude.

3. The mapping of the foil mean chord nose section is associated with the inboard phase angle of conoid-relative longitude and latitude coordinates. The first Meta Element phase fragment data points are associated with this nose section parallel to its plane of longitude and at chosen fixed orientation as is shown. Now the process is repeated for the nose section, which is aligned with the next incremental plane of longitude and next incremental line of latitude and the sequential numbered tail section sequence of integral multiple phase angle relative to the change of conoid angle of longitude. This is repeated as shown in such a way that the mean-chord-normal rays of nose section coordinate points always stay equidistant and equiangular to the tangents of the sides of the conoids even during the reversal sequence, one phase of which is shown at the top of the image of back-to-back conoids. This is continued until the entire axial plane path as shown at the top of FIG. 7a–7c under the title "axial progression" and "axial retrogression" is complete as a three dimensional dataset.

4. With mean chord data points established, the envelope contour is collectively or individually recreated by the polar ray distances and tangents associated with the corresponding local chord data point, using cubic spline curves.

5. This is repeated for every desired phase angle increment with the exception of the starting and reversal vortex sequence, which are created by a process of phased interpolations between the phase states to be connected.

6. The total area of helical elements is analyzed for viscosity and incremental drag and this integrated value is used for system dissipative constant.

7. This database is now duplicated in the desired angular increment to result in the desired number of lobes.

8. Total force integrations can now be made, ascertaining lift by transferring Meta-Element dynamic forces to the tangent of inclination of local surfaces. Wake rotation and effective actuating plane is similarly determined and varied by sweep and tail flexion in an iterative recursion.

9. When the above calculus of variation is complete, the completed data points are suitably smoothed by interpolation via the use of a cubic spline or other means. They are then provided a suitable hub attachment and subsequently machined by CNC mill.

10. If their is no axial retrogression, all data points parallel to the rotational plane can be separated out in the specified increments to conform to the desired material thickness to be used in later laser cut layers of the blade. This involves the additional step of connecting the inner and outer envelope data points by means of a cubic spline curve—or other means—as well as mapping the separate keyed hub layer with its connecting support spokes to the inner nodal points of each propulsive element layer.

11. In case of axial variance this former method is varied to result in a 3-dimension section plane substantially parallel and normal to the leading edge that is used to section the database into convenient layers that can contain structural recesses contributing to strength per weight as shown in FIG. 20, or act as an air plenum for later introduction of laser-cut surface orifices enabling friction reducing minute air entrainment 115.

12. This is repeated for all layers until the complete propulsive element data points including hub and support structure exists as a data base.

13. Low volume manufacture of this device could consist of CNC controlled laser cutting of all keyed layers, then sliding them onto their keyed hub, mounting them in a gantry, brazing them together in a foundry and finally powder coating the results with an abrasion resistive, low friction coating that eliminates all surface irregularities.

Given the flexibility of design using these methods, innumerable variations as to number of lobes, reversal variations and axial retrogression become possible. An example of such a propeller is shown in FIG. 14. The after-body corrugations—embodying the Meta-Element harmonic sub cycle—have been greatly exaggerated to provide graphical clarity.

This additionally improves the propeller's resistance to foreign object fouling and also makes its shape less injurious.

WIND TURBINE—DETAILED DESCRIPTION

The proposed wind turbines are devices of high lift to drag and low downwind force, and as such relatively free of the economic imperatives that presently dictate size and design configuration of conventional turbines. They thus offer unusual design flexibilities, allowing them to address some of the aesthetic considerations that presently prevent public acceptance in other than rural settings. The main objection to conventional turbines in urban settings is the overpowering bulk of the installation required to sustain the high loads of anticipated wind extremes.

If, in order to generate an economically meaningful quantity of power, rotor size and tower dimensions can be kept to dimensions that could unobtrusively blend in with scenic character and architectural elements, applications previously closed to wind power would become possible, as these are presently constrained by zoning permit The second most important consideration affecting wide-scale urban adoption is the noise and the visual impact of the stroboscopic flickering of the spinning blades. All of the versions of the proposed turbines have no gearbox and open-tipped blade and are therefore unusually quiet. They present visually unified slow and inherently non-flickering spiral motion. Additionally, using slender fiberglass towers, these devices can store the energy of gusts in small swaying deflections. Such motion—reminiscent of trees—can more easily present harmonic scenic counterpoint and integrate with clusters of herbage and no longer dominate by overwhelming contrast or dashingly obtrude upon the scenic quality of landscape, or its pastoral character.

Public aversion to stark, massive and industrial monumentality upon treasured and unique landscape character is universal and thus a likely motive behind negative zoning board rulings. If this is so, scales that do not overwhelm landscape scenic elements, forms that are rounded, and motions that are perceived as sinuous and slow, cultural evocations that are playful, quaint or intriguing do not present the harsh cuts of massive angularity that presents such inharmonious juxtaposition with the curvilinear forms and sinuous motions of nature.

Given these devices' relative freedom from purely economic imperatives, the vast talent pool of landscape architects, urban planners and visual artists—well practiced in overcoming objection by providing communities with aesthetic asset—, can be enlisted to address these hostilities, and thus wind farms proposing these devices will likely experience less resistance.

Figure 5B:
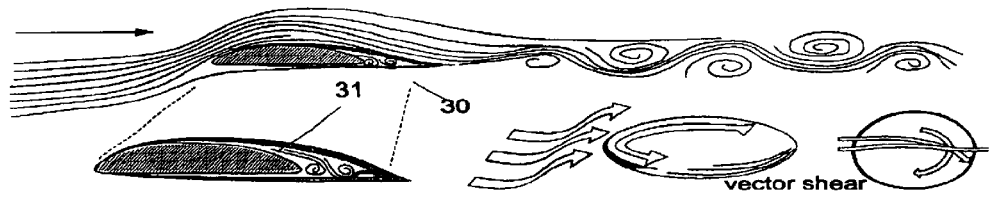
Figure 5C:
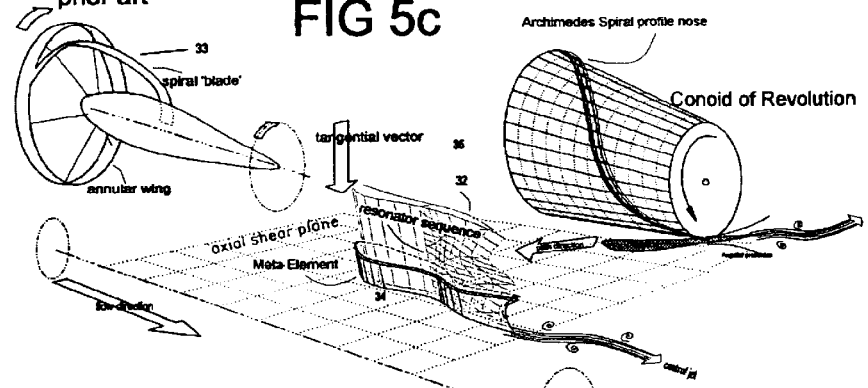
Figure 5D:
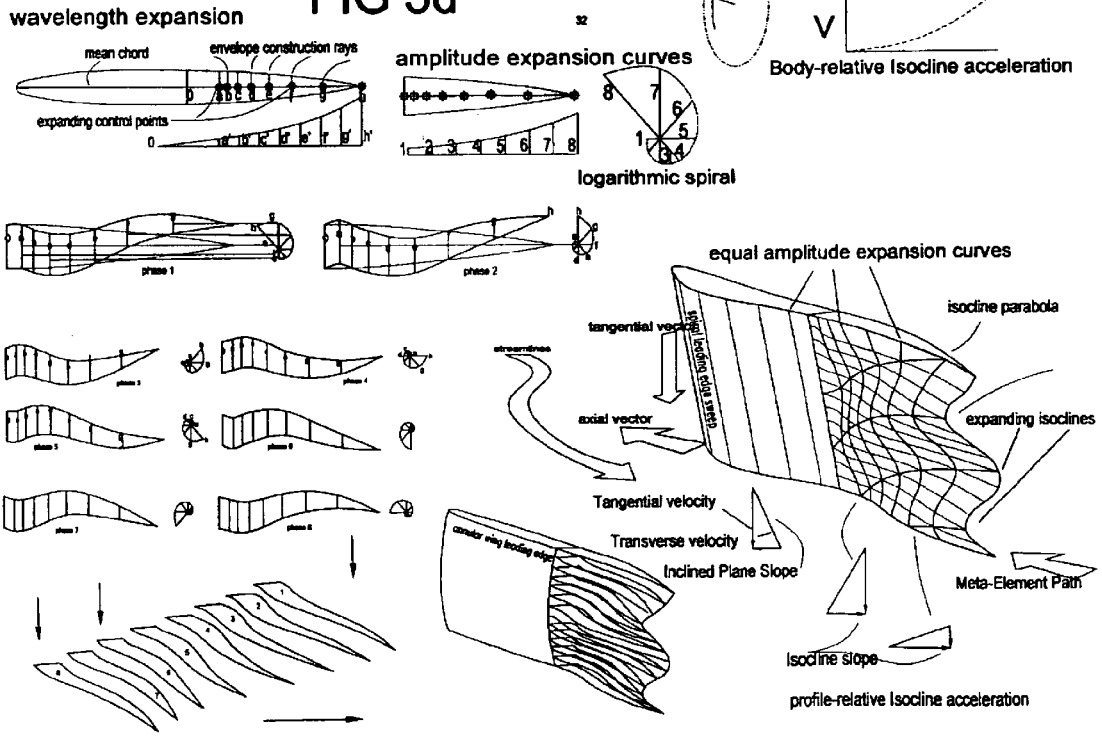
Figure 6:
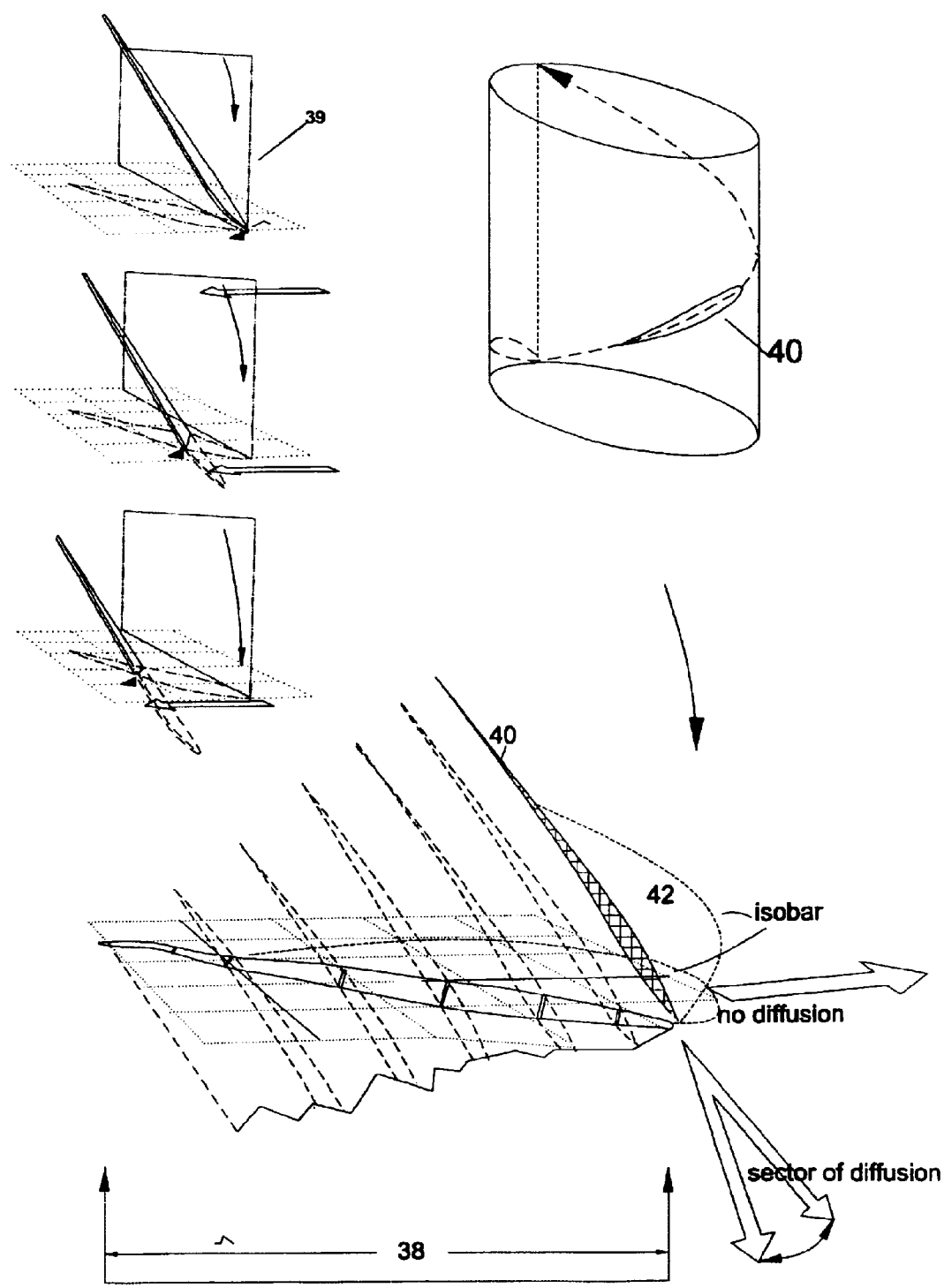
Figure 8:
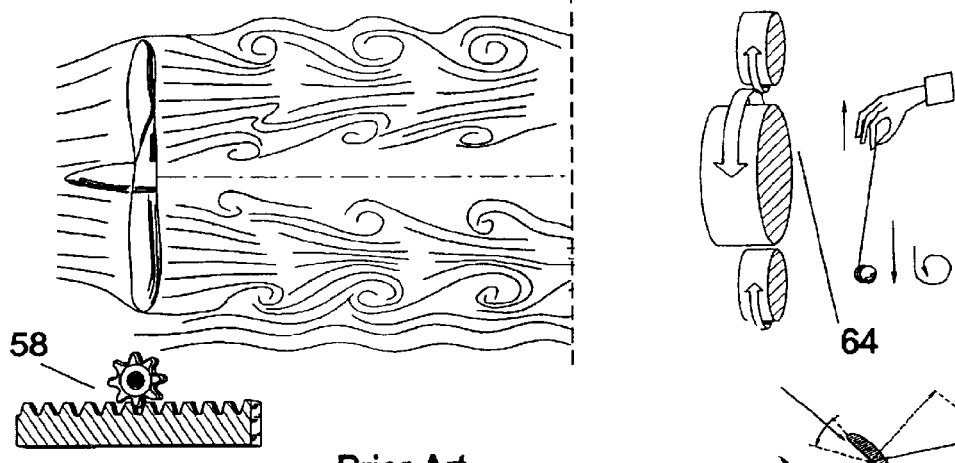
Figure 8E:
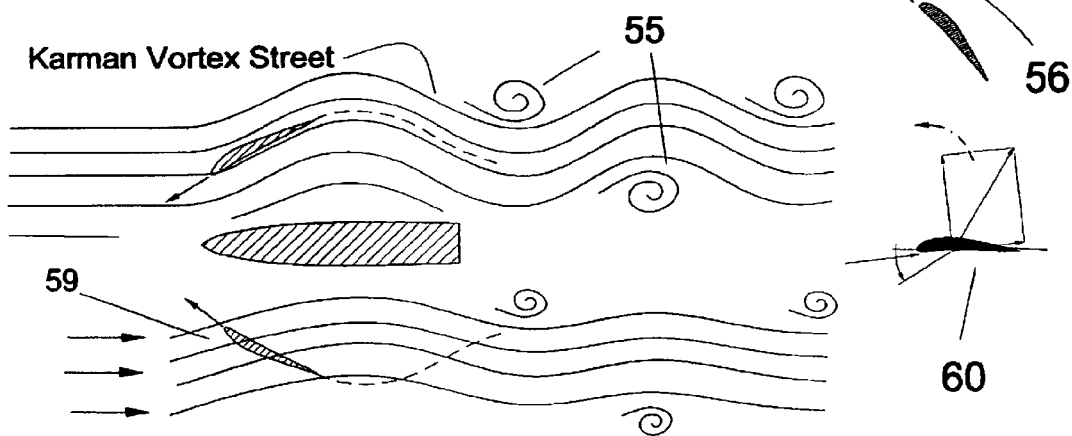
Figure 14A:
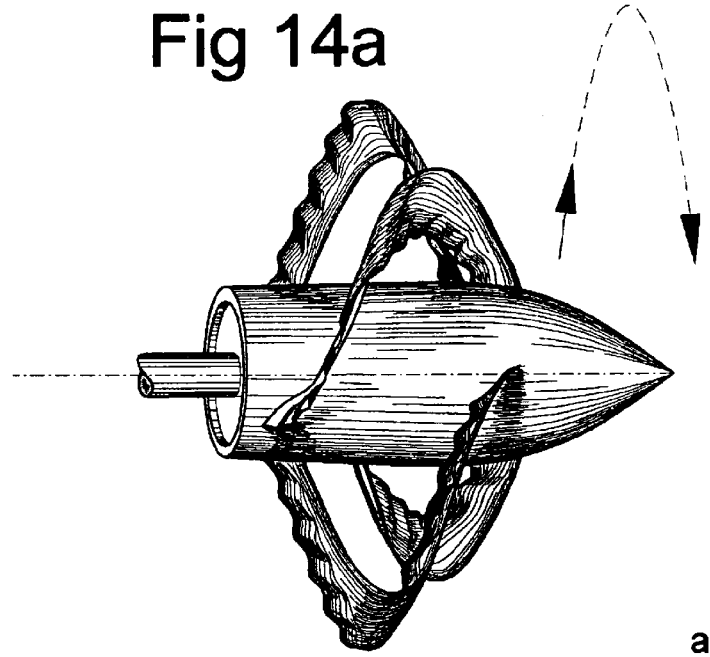
FIG. 14a shows a propeller displaying exponential axial retrogression on the shear plane with the Meta-Element proceeding along a path in a single direction.
Figure 14B:
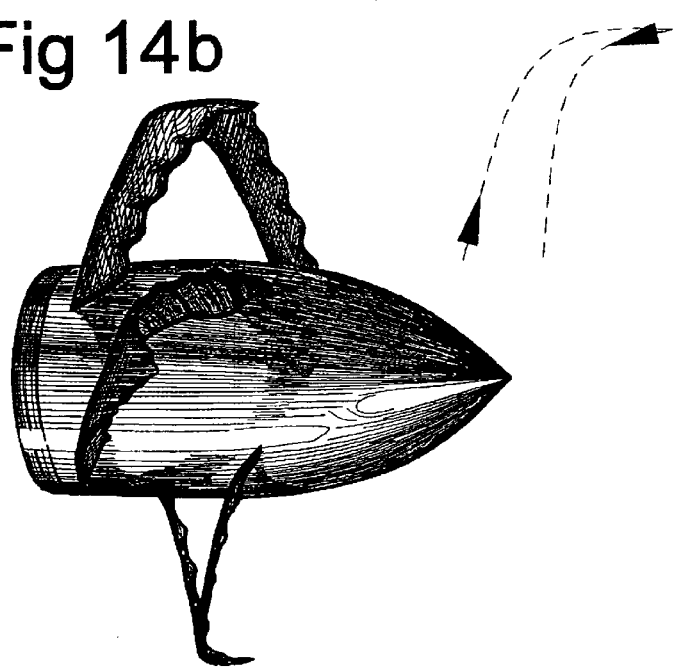
FIG. 14b shows a propeller displaying linear axial regression with the Meta-Element changing ends at the radial limits and reversing orientation, as well as its direction of motion.
Figure 15:
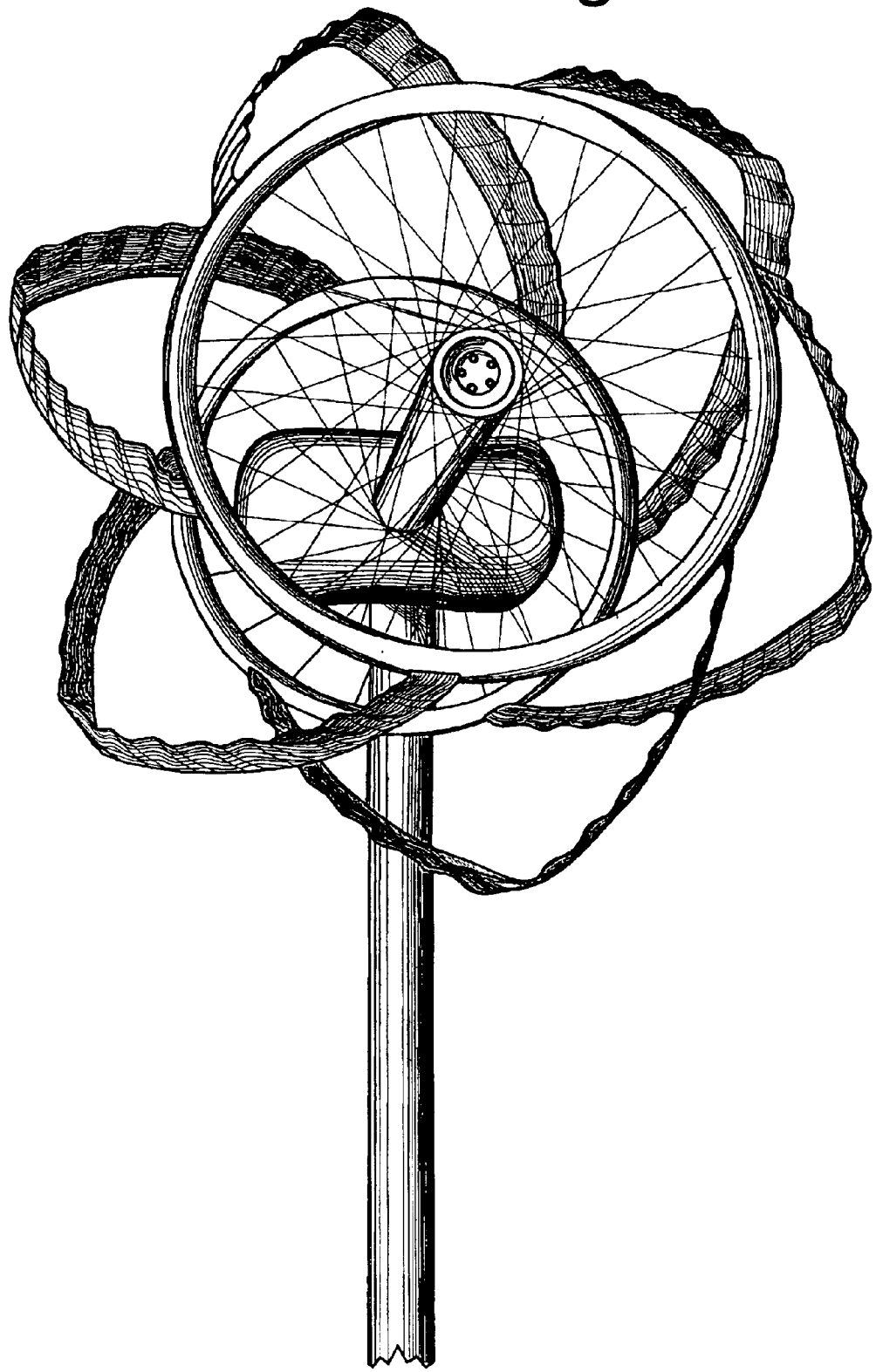

These wind turbines allow many design variations that take advantage of the device's high output to downwind force and structural qualities giving great resistance to Coriolis and other destabilizing forces:

1. As shown in FIG. 15, turbines of unprecedented scale may be built of modular components loaded mostly in tension, using very light and efficient Meta-Element catenary half loops fixed upon aerodynamically enveloped rings of tubing tensioned by cable stays. Such a device, being relatively insensitive to gusting as well as tolerant of very high wind speeds, directionally unstable inflow as well as tower shadow is a self-aligning device. Not shown is the aerodynamic fabric hub that forms its inner hub surface as described in FIG. 5c. It has a greatly expanded operating envelope, making sites of lower wind speed economically feasible, whereas its spiral motion and low noise footprint make it less objectionable for location in sites of higher population density. Not shown for visual clarity, is the possible fabric aerodynamic hub enclosure of FIG. 5c and possible aerodynamic anti-twist tail-vanes.

Figure 16A:
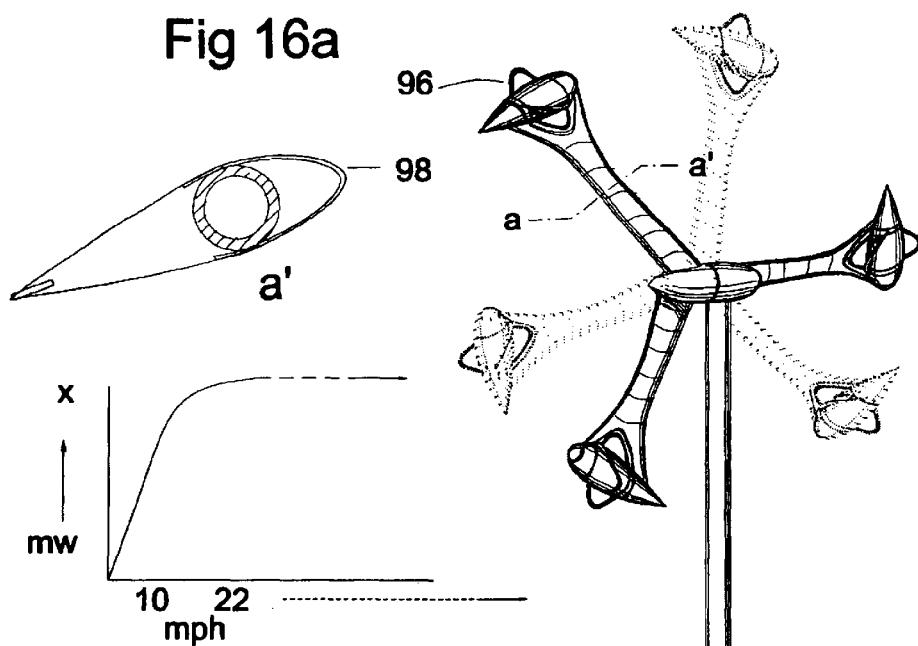
Figure 16B:
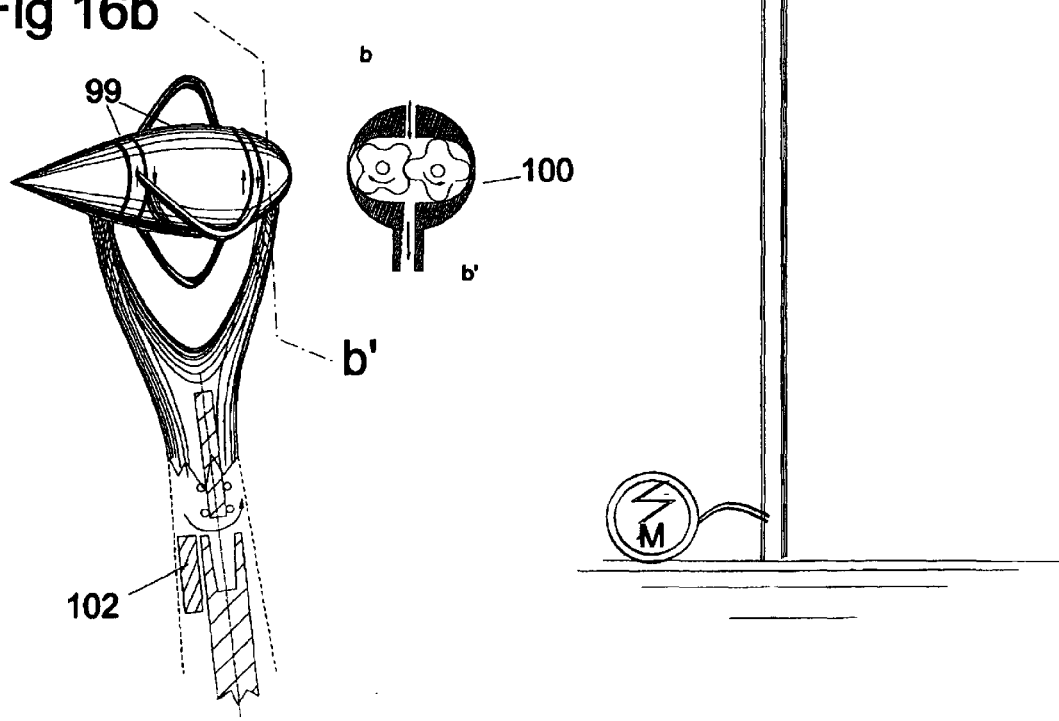

2. FIG. 16 shows a turbine deploying the actual power-generating Meta-Element turbines 96 at the tip of many aerodynamic high-solidity multiple 'blades' that rotate slowly and have the sole purpose of generating the tangential velocity that concentrates and thus funnels the momentum of the diverging much larger inner stream tube into the operating-disc edge high speed tip region. This results in very high apparent wind velocities at the actual working area of the turbines and that therefore enables extremely cost-efficient generation of power especially in sites of very low average wind speeds. As these broad inner blades are lightly loaded, and do not need to transmit torque, they can be made of inexpensive nested tubular materials, rigid sheet leading edge cuff 98, tensioned trailing edge strip, and fabric envelope. These slow-turning blades can simply be scaled to length in order to achieve constant power output from any reasonable wind resource and as is shown on the accompanying graph in FIG. 16a, designed to develop full output at low wind speed. As wind increases, these inner blades progressively decrease their angle to the wind under electronic control. As the small actual working rotor blades automatically decrease their angle of attack in high wind speed—as is shown in the vector decompositions of FIG. 13c—they have no need to cease operation in high wind. Along with these blades, inner hoop-outer hoop 99 counter-rotating working elements of FIG. 16b actually make a small contribution—due to their described duct-based forward force vector efficiency—to the tangential force necessary for this motion. Optionally, rather than driving a generator, these devices' intrinsic high angular vet and high output makes possible the economic benefit, weight advantage and fail-safe operational simplicity of driving light scroll, centrifugal or 'Roots' compressors fed by stagnation pressures or air pumps 100 that pressurize the tower as a storage plenum, and thus provide an inexpensive energy-leveling and energy-storage mechanism. On a cost-benefit basis, this scheme may outweigh the moderate loss of nominal efficiency that accrues to air compression vs. direct electrical generation and thus also allows a conveniently sited, accessible generator interface at ground level, especially suited to variable conditions of wind. As output power of any turbine varies as the third power of the apparent wind speed, the Meta-Element computer simulation of tip elements of moderate 8' radius, using inexpensive 40' blades, predicts unprecedented cost benefit, compared to any other method of power generation, let alone by conventional wind turbine. Such a turbine has the advantage of low initial cost, low maintenance, infinite adjustability via electronically controlled servo loops, unprecedented cost-benefit in very low wind speeds and no need to curtail operation in high wind, as the turbine is progressively sowed via a simple blade feathering servo loop 102.

Figure 17:
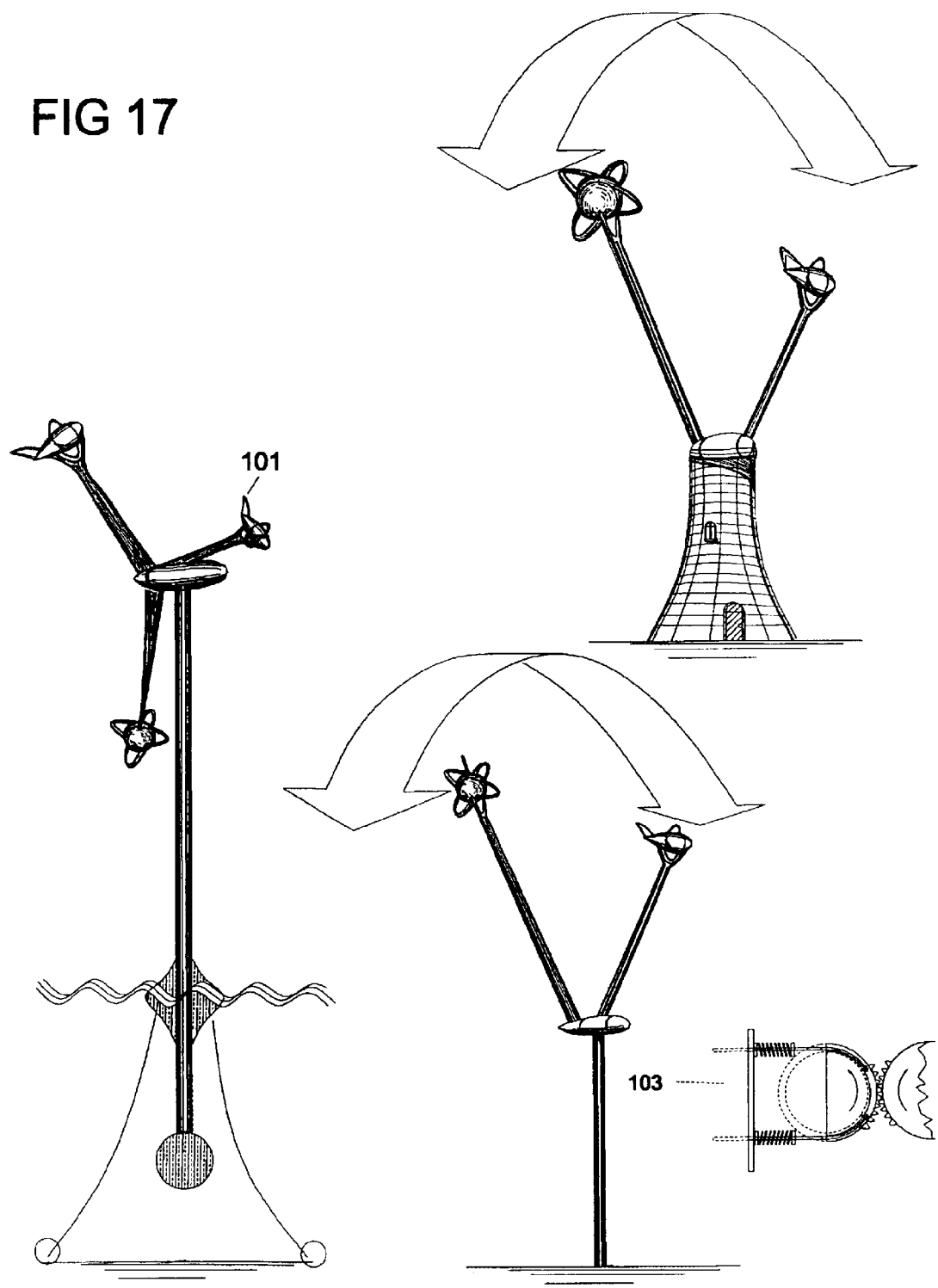

3. The variant device shown on the left of FIG. 17 uses the same slow rotation of wide-chord high-solidity of many blades, which allows operation in deeper waters than is presently economically feasible, out of sight from the mainland. This device would mount on an empty and ballasted wave-piercing steel or fiberglass tube, constructed ashore and towed to the site and moored by use of inexpensive fiberglass cable/cement block catenaries. Due to the aforementioned self-reefing qualities, very low downwind force—and therefore acceptable heeling moment—and unprecedented size would enable massive economic benefit in its ability to generate onboard hydrogen at vast scale. The production of hydrogen is presently as expensive as it is energy-intensive. Physical law stipulates that it takes more energy to convert seawater to hydrogen than is contained in that quantity of produced hydrogen itself. The cost-basis is thus mainly determined by the cost of input power, and makes sense only if such input power is inexpensive. As the automatic process-control techniques for generation of hydrogen by electrolysis has of late approached 90 percent efficiency, and the ability to store it at 5000 PSI is commercially available, the expense of long distance electrical transmission would be avoided in favor of regular supply ship visits to what is essentially an offshore hydrogen factory that collects free power, uses it to convert seawater to deionized water through reverse osmosis, converts that in turn to hydrogen, pressurizes it and stores it in transferable pressure vessels. These would be exchanged by regular supply vessel visits. Most of our landmass is surrounded by vast, relatively shallow, windswept expanses of ocean, outside sea-lanes of navigation, much of it under lease to energy exploration enterprises. Such leases would become exponentially more valuable, if every square mile of this leased area turned out to contain the energy equivalence of a major discovery of fossil fuel. This would as well be a useful application in shallow coastal waters and could additionally serve as a navigational beacon in low visibility conditions. The variant devices shown in the middle and on the right of FIG. 17 achieve this higher apparent velocity by a meshed countervailing oscillation enabled by passive tuned spring mass balance 103, such motion entirely controlled by electronic servo loop activating either tail vane or feathering axis stepper motor control. Such installations would be useful in areas where any level of noise, or blade passage proximity might be objectionable. The device on the right shows how this arrangement might be used to evoke cultural themes that have demonstrated greater public acceptance, such as the traditional Dutch windmill. This mechanism would be implemented using slow speed counter rotation against pairs of tuned compression or torsion springs incorporating stops that stores and returns kinetic energy. The entire motion would be controlled by electronic servo loops.

An important additional feature implicit in all of the foregoing air turbine devices has to do with its purposeful addressing of certain public objections that may in fact have a basis in physiological self e involuntary conditioned response.

Such resistance is generally represented is having purely esthetic basis, but may also involve a reaction of distrust to the massive turbine blade, the whistling tip descending at velocities of up to hundreds of miles an hour. Since such blades have been actually been thrown several hundred feet, I believe that our conditioned reflexive response to such devices may well predispose us to unconscious hostility and therefore condition us to limbic-system-bred esthetic dislike, by mechanism of conditioned response. The Meta-Element turbine addresses these latter public resistances through design features that substantially eliminate the sense-experience of overwhelming speed, and of perspective-disjointed motion of separated massive elements.

HYDRAULIC TURBINE SYSTEM—DETAILED DESCRIPTION

As the Meta-Element turbine is a device with the novel advantage of unprecedented parameters of lift to drag—or torque for downstream force for a device of rotation—similar to the kind of efficiency advantage that a high performance sailplane displays when compared to glide-path angle of the space shuttle—it is uniquely suited to exploit the vast potential kinetic energies of the world's very low velocity—2 feet per second or more—natural water flows.

Such energies—if truly exploitable on a sound economic basis and in an operationally simple and robust fashion—have the potential of satisfying the present level of the world's electrical power consumption many times over.

As the operation of iceboats and land yachts has shown, any device that generates—and benefits from—bound-vortex pressure waves advancing against prevailing ambient inflow, —depending on its lift to drag ratio—can generate very high differential pressures from the enhanced apparent velocities resulting from the vector addition of these relative motions. These differential pressures can be many times the pressures possible from nominal ambient velocity as measured by the stationary observer, resulting in measured competition iceboat speeds of over 140 mph, this being many times the prevailing wind speed.

As the resulting dynamic forces are related to these velocities exponentially—by the square of the velocity—the vector addition of Meta-Element relative motion to even moderate ambient fluid speeds can be seen to potentially generate significantly higher resulting forces.

As the Meta-Element turbine's detached pressure wave is expressly designed to advance against prevailing flow, this same phenomenon is used to advantage to extract energy from the flows of very low velocity prevailing in rivers, tidal flows and shore-bound incoming ocean gravity wave elliptical orbital flows.

Taking advantage of the recent revolutionary advances in silicon-based power conditioning technologies and advanced polymers, the following low maintenance schemes of ultra-low environmental impact can provide significant point-of-use electrical power generation capacity and peak demand leveling through its built-in storage reservoir capacity, particularly in locations where electric power infrastructure is undeveloped.

Figure 18:
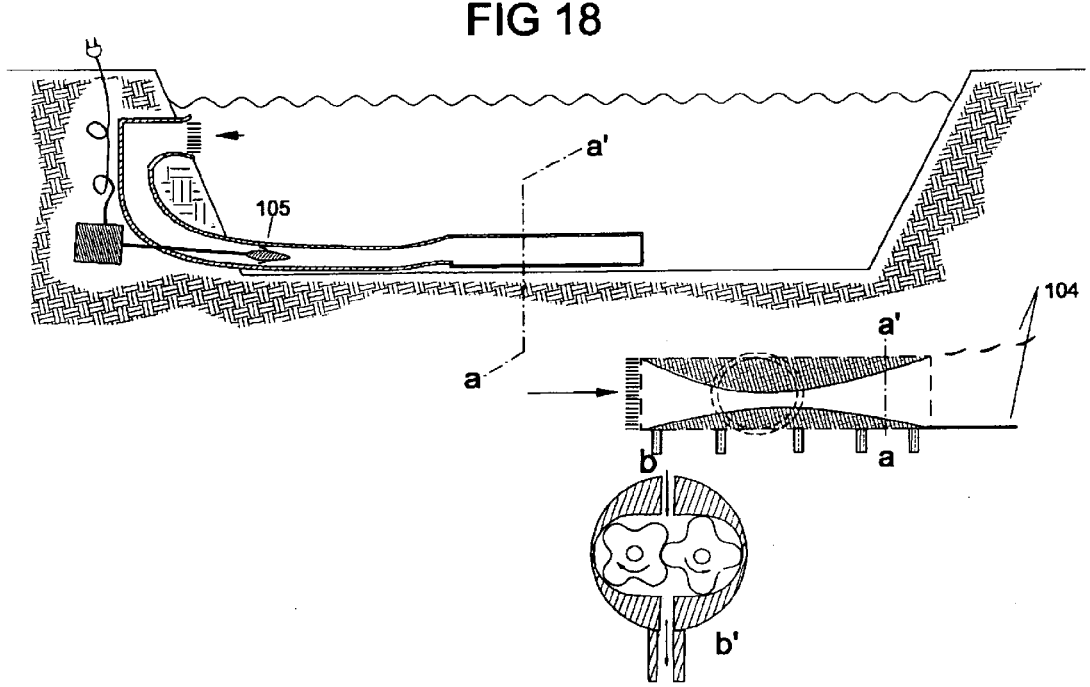

1. As shown in FIG. 18, a Meta-Element turbine 105 is interposed between the flow of an intake close to the riverbank that empties into a stream-wise concrete Venturi tube based constriction exit finitely raised into the high velocity flow of the central channel, which assists wastewater ejection via beneficial pressure gradients. The conduit for this flow is ordinary plastic sewer pipe. The exit is cast from concrete. Care is taken to prevent silting by a mixing foil cascade 104 benefiting pressure recovery and means preventing downstream sift accumulation.

Figure 19:
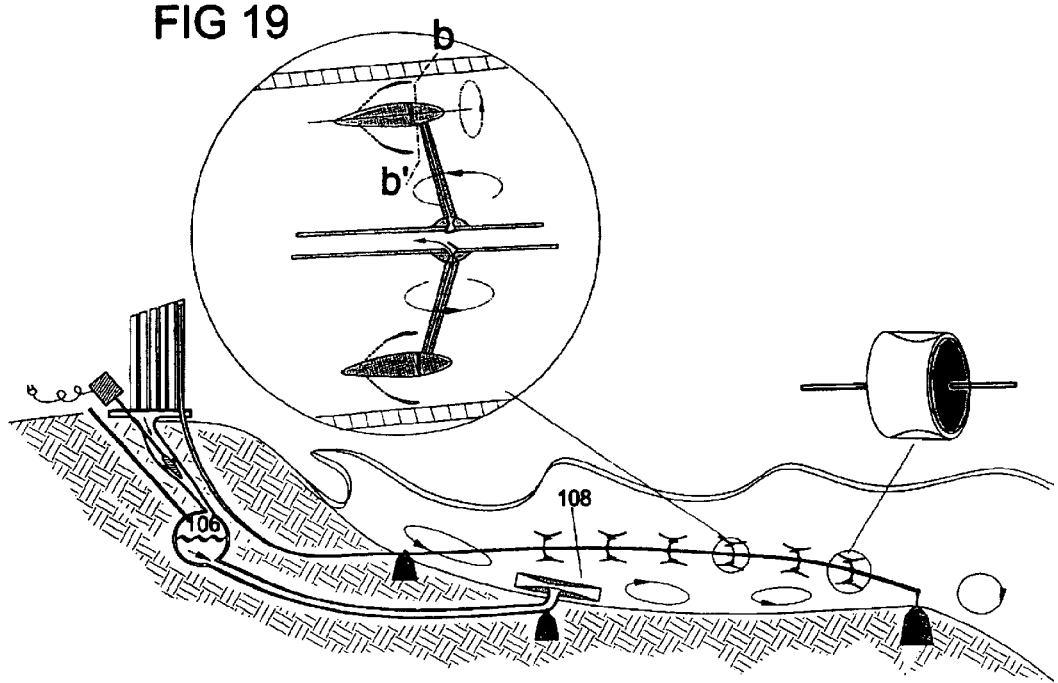

2. FIG. 19 shows a variant of this scheme. A plastic conduit spanning at least 2 wavelengths in order to minimize lateral displacement wave drag forces and aligned with prevailing wave motion, is moored offshore at appropriate depths and provided with many self aligning Meta-Element turbine devices running in an anti-fouling protective plastic conduit Venturi-shaped duct, powering simple, fail-safe and redundant, high molecular weight injection molded plastic displacement pumps rotating around molded spherical bearings that feature one way plastic hinged flapper valves. In this way, both tidal directions can be used to pump this flow up to an onshore reservoir made of a banded vertical plastic pipe array of suitably sculptural shape that feed the actual Meta-Element turbine shafted to the electrical generator. Wastewater flow can be assisted by a vented plenum 106 and a Venturi based bi-directional exit 108 similar to the variant of the previous drawing.

To Summarize the Benefits of the Meta-Element Hydraulic Turbine:

As a device exhibiting high values of lift-to-drag, and thus torque to downs m force, it functions superbly as a low-head hydraulic turbine. This quality additionally allows the Meta-Element turbine to focus and thus 'funnel' the kinetic energy of a large volume into a very small, and economic operating area. This opens the possibility of tapping the inexhaustible solar powered flows of the earth's water based weather cycle, at point-of-use, by small local modular increment, and without resort to expensive and ecologically disruptive dams. This can bring vast economic benefit particularly to areas of low levels of economic development and infrastructure with relatively low levels of investment, incrementally expandable as additional need arises. It can additionally provide the overwhelming majority of populations that inhabit river basins, or near tidal flows, or seashores non-controversial peak-power energy resources without environmental impact and with relatively small economic expenditure.

As a device of fixed geometry, built-in resistance to fouling and of great simplicity, it is superbly able to exploit the corrosion, marine bio-adhesion and friction controlling capacities of certain modern high-density polymers.

Using such injection molded plastics in mass production, such devices—and their systems—promise to provide a cost-benefit that greatly exceeds that of even the Meta-Element wind turbine.

Additionally, as this estimate of operational cost-benefit is based on a very conservative computer model that has been validated by measurement of a functional prototype, this scheme provides a uniquely powerful and unprecedented economic argument for the adoption of methods that by their very nature are not only economically but also ecologically highly beneficial, all the while purposely addressing other well-known political and cultural antipathies based on esthetic obtrusivity and other intangible resistances by simply hiding the devices underwater.

AIR PROPELLER AND FAN—DETAILED DESCRIPTION

Figure 20:
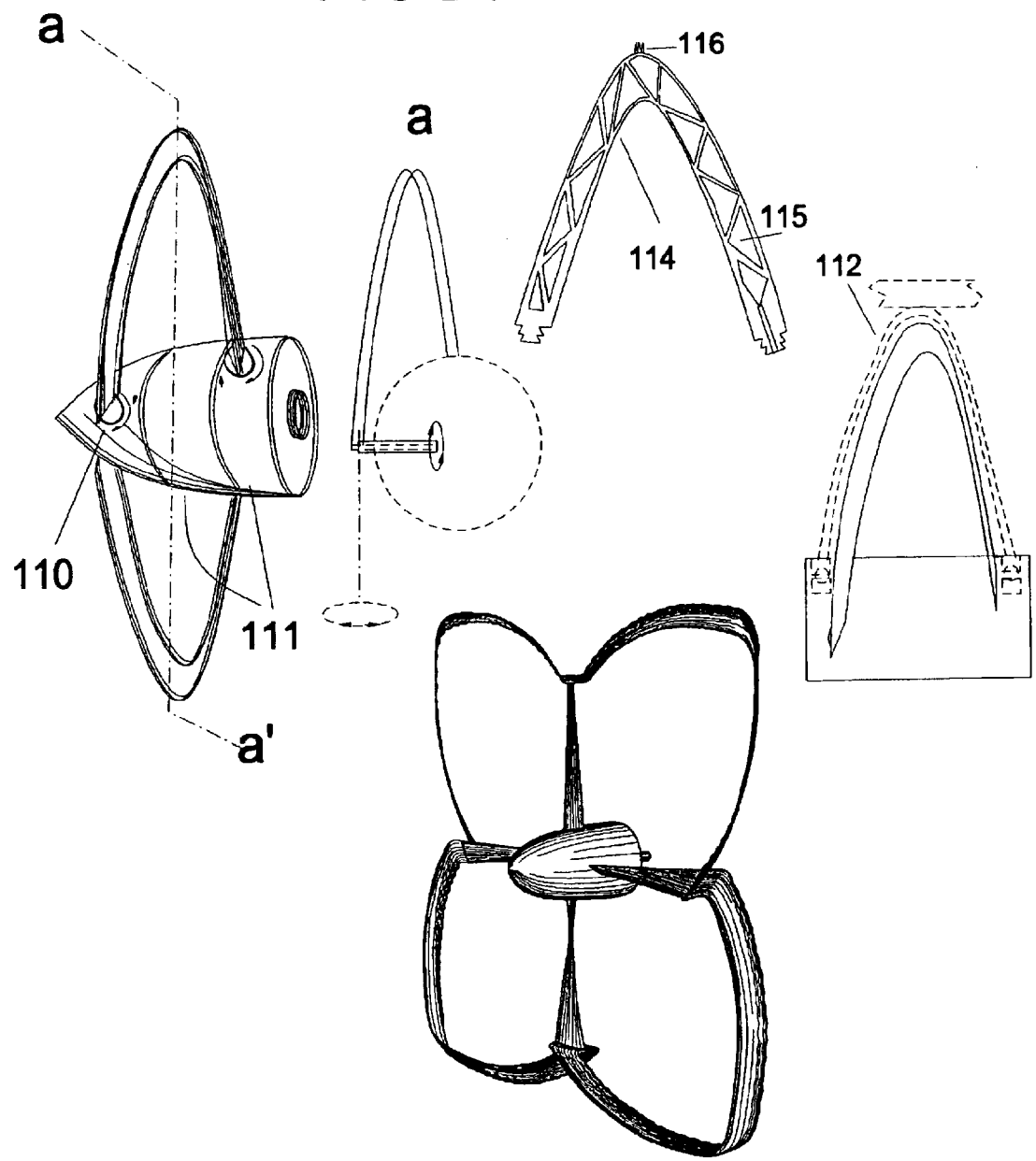

Using the same methods and parameters of design as the aforementioned water propeller, —including Meta-Element Retrogression—the three-dimensional database of an air propeller is constructed by taking the design constraints of the relative preponderance of centrifugal and other dynamic forces into account. Thus the air propeller will incorporate lobes of close to centrifugal catenary curvature to minimize bending forces. It will additionally incorporate substantial Meta-Element boundary layer scavenging corrugations particularly in the outer reversal portions to minimize transonic buffet In order to minimize mass, profiles become increasingly thin in the outboard sections. Such a propeller may take many forms and may additionally be controllable in pitch. The lower half of FIG. 20 shows a fixed pitch 4-lobe embodiment of small axial retrogression described in FIG. 7a using lightly loaded helically oriented inner supporting 'blade-spokes' to support the catenaries of the actual propulsive element.

This arrangement can be varied using a larger hub-spinner and 2 lobes with a linear hydraulic variable pitch mechanism 110 using blade axis feathering mechanism mounted in differentially twisting spinner disc stages 111 that upon differential twist, coordinated with the feathering axis torsion mechanism, allow variable rotor orientation for constant speed operation. This method exploits the intrinsic torsional flexibility of thin catenaries combined with superb resistance to thrust-induced bending, flutter and harmonic oscillation due to the devices thin, fore-and-aft triangulated stance of substantially centrifugal catenary curve.

COMPRESSOR ELEMENT—DETAILED DESCRIPTION

As with the air propeller, a major strategy of design of the compressor element emphasizes resistance to centrifugal and other dynamic forces. In the absence of inner loop counter rotation, considerations of stage sealing will need the addition of compressor case supported axially oriented stators 112 in the nesting shape of the half loop compressor element of FIG. 20 to prevent tangential flow and reversal in the tip area. This device's excellent suitability for weight-saving layer construction, diffusion bonding, and EDM post machining facilitates strength to weight optimization.

TURBINE ELEMENT—DETAILED DESCRIPTION

All design features of the compressor element—except for substitution of Meta-Element Axial Retrogression—are incorporated in the construction of the turbine element. Just as in the air turbine, due to the substantially greater tangential forces generated by the element orientation due to axial progression, inner loop counter rotation, or a turbine shape-nesting stator stage is indispensable.

The major differences are in the use of materials that have greater thermal resistance as well as the built-in design of transpiration mass flow through the layered construction of the turbine element 114, of FIG. 20, which includes a plenum to facilitate the introduction of the cooling film. Stage sealing may be accomplished generally as in the compressor, or via a single substantial spiral, film-cooled tip extension 116—here exaggerated for clarity—riding in a mating casing depression.

This all too brief description is well aware of—and makes no small matter of—the many open questions thrown up by this format-constrained attempt to introduce a radically novel concept in a field as sophisticated and technically mature as the design of the modern gas turbine.

These unusual geometries undoubtedly introduce difficult technical challenges especially in regard to low and high-pressure compressor and turbine counter rotation, stator arrangement and tip sealing.

The predictions of substantial efficiency gains by the conservative Meta-Element computer model, as well as the considerable structural benefit of the centrifugal catenary shapes' intrinsic relative immunity to the existing major problem syndromes of blade fatigue, blade failure and heat-tolerance stricture, may be sufficiently promising, however, to consider these additional benefits:

1. Gains of unusually high efficiency through the optimizing of force vector, smooth non-pulsating diffusion, maximizing of inflow vectors using axial progression, allowing widened operating envelopes
2. Unusually low levels of noise, and significant reduction of specifically low attenuation noise radiation spectra. As noise is a significant design constraint on aircraft operating close to population centers, this itself is a significant advantage
3. Unusual resistance to stall and surge due to the novel feature of boundary layer control
4. Should existing or modified geometries favor lower turbine inlet flow velocities, unusually high turbine efficiency gains through Meta-Element axial progression would permit substantially higher torque per given momentum change.
5. Higher turbine inlet temperature enabled by the centrifugal catenary shape providing high resistance to flutter and resonance, great resistance to bending forces, in turn allowing the use of thinner and fluid dynamically more efficient shapes of a lower thermal mass that thus is easier to cool through transpiration flows.

CONCLUSIONS, RAMIFICATIONS AND SCOPE OF INVENTION

Thus the methods of the hysteresis based Meta-Element time series as well as its resulting high lift to drag physical devices provide the venue to greatly improved cost-benefit for all axial flow devices.

While my above description contains much s these should not be construed as limitations on the scope of the invention, but rather as an exemplification of several preferred embodiments thereof. Many other variations are possible.

For example:

An annular wing that combines the function of thrust and lift, combining these in turn with the stream tube convergence/divergence functions of a duct and contributing to, or acting as primary lift provider, by simple inclination to the axis of fight, of superior lift to drag ratio, of very light weight through the use of centrifugal catenary structural shapes.

An annular hydrofoil that also functions as a duct and combines the function of thrust and lift, of superior lift to drag ratio, of very light weight through the use of centrifugal catenary structural elements, and of very high resistance to foreign object fouling.

A 'sail' that combines the functions of delivery of torque for propulsion and improved side force vectors forward inclination due to its superior lift to drag ratio, of very light weight through the use of centrifugal catenary structural shapes, easy variation of output and built-in reef-ability, and to allow the vehicle to progress directly into prevailing wind direction.

Any other devices that accelerate or decelerate flow can additionally benefit from the ease and low cost of low volume manufacture implicit in the computer aided design and manufacture of the proposed invention.

Accordingly, the scope of the invention should not be determined by the embodiments illustrated, but by the appended claims and their legal equivalents.

What is claimed is:

1. A method of inclined-plane-based boundary layer transport implemented by forming discretely oriented convexities and concavities of such variations of angle to bulk fluid flow upon the rear working surfaces of that class of rotor blades that have the shape of rigid continuous profiled spiral or ring bands, implemented by adding progressive phase-angle fragmental increments-of-amplitude to progressive axial-plane-relative profile coordinates as can effect such surface-to-axial plane chord-wise progressive variation of change of inclination as can accelerate fluid, the shape of which is characterized by two axial-plane-relative isocline parabolas of fluid acceleration, as well as by a constant subtended angle of axial azimuth connecting successive azimuth-increment axial-section maxima of convexity, said curves and angle that together evidence such variable convexity and together comprising the steps of:

a) translating the coordinates of a conventional fluid dynamic profile tail section envelope chord-wise coordinates into logarithmic coordinates defining exponential wavelength expansion isocline control points, b) constructing an amplitude expansion logarithmic spiral to offset logarithmic decrement viscous dissipation, then its corresponding parabolas of amplitude maxima, then envelope construction means and envelope reconstruction cubic spline c) progressively remapping the individual phase angle axial profile section envelope collectively into a multiplicity of individual integral multiple incremental phase angle fragments as can define a single periodic function cycle d) associating said progressive individual integral coordinate sets with the front element coordinate set of said spiral band blade such that for every increment of fundamental subtended angular change of axial azimuth of said front element, the next numbered phase angle increment-of-generation of each successive associated individual phase angle fragment shall be an integral multiple of the front element coordinate set angular change e) connecting the envelope construction rays with tangential and axial cubic spline interpolation curves or their functional equivalents to establish a continuous physical envelope shape f) constructing a plurality of said blades according to these coordinates and attaching them at various locations of a hub and such fixed support that allows said blade assembly to rotate whereby, upon rotation of the resulting continuously shape-sequenced bands through the axial shear plane multiplicity, the body-relative fluid acceleration caused by the body-relative isocline acceleration attending anguillar or carangiform propulsion of aquatic creatures is substantially duplicated through the mechanism of spaced-quadrature vector-coupling and as such, useful for the expulsion of boundary layer accumulations as well as for limiting spanwise flow, turbulence, and undulation of reaction mass.

2. A method of boundary layer control as in claim 1 except that the compound periodic function progressively remaps the axial profile section upper and lower envelope individually using differential starting helix angles and acceleration parabolas to result in a multiplicity of individual incremental phase angle fragments as can define a single periodic function cycle and associating said individual envelope coordinate sets with the front element coordinate set of said spiral band blade such that for every integral increment of angular change of numbered azimuth plane-of-association of said front element, the numbered phase angle increment-of-generation of the individual phase angle fragment shall be an integral multiple thereof, whereby, upon rotation of the resulting spiraling bands, the expulsion of boundary layer accumulations will result with minimum pulsation, noise and undulation.

3. A method of boundary layer control as in claim 1 except that the compound periodic function is a half-rectified square wave or saw tooth wave function of such frequency as to be inaudible, that progressively remaps the axial profile section upper and lower envelope into convexities only using discrete profile-relative suction and pressure side differential starting helix angles and acceleration parabolas whereby upon rotation of the resulting spiraling bands, the expulsion of boundary layer accumulations will incur minimum expense of manufacture, as well as minimum pulsation, noise and undulation.

4. A rotor of manufacture that can beneficially interchange kinetic energy with axial flows, consisting of a plurality of blades, each of which form continuously profiled, rigid spiral or ring bands, the progressive forward-portion axial sections of which have fixed chord-axis-wise orientation to the axial surface inclination of coaxial truncated cones-of-generation along said cones' progressive increments of axial azimuth and co-latitude coordinates, each said spiral bands being attached at azimuth variations around and axial location along an elongated aerodynamic hub of body-of-revolution that is itself attached to fixed supports which enable it to rotate, said continuously profiled bands combining means to eject boundary layer accumulations through tail section variations of disposition of convexity and concavity governed by a periodic function, such variations of convexity physically delineated by characteristic fluid-flow-relative expanding angles of isocline parabolas and axial-plane-relative angles of parabolas of maxima of chord-normal convexity, as well as by a subtended coaxial angle of constant azimuth increment defining the disposition of successive axial section maxima of convexity, whereby such rotors can efficiently interchange fluid momentum change with an impulse of tuning force generated by deflecting mass flows rates with low frictional dissipation and limited spanwise flow.

5. A rotor of manufacture according to claim 4, wherein said spiral band blades are attached at one end to an axial location along the midsection of said elongated aerodynamic body-of-revolution that is itself attached to fixed supports which enable it to rotate and at the other end at an azimuth variation of a large-diameter coaxial annular peripheral profiled rim-band, itself also endowed with said tail-section variable convexity, said rim being in turn supported by tensile spokes upon the nose region of said rotative aerodynamic body-of-revolution, whereby such a rotor will capture the momentum attending greater than working diameter mass air flows quietly, for modest expenditure of material resource.

6. A rotor of manufacture according to claim 4 wherein said spiral band blades tail section working surface contains continuously variable corrugations of convexity only, as defined by said collective parabolas of isoclines, resulting in side-differential isocline parabolas attending the high pressure and low pressure sides of working surface tail section and resulting in discrete inclinations of convexity only whereby ease of manufacture is added to aforesaid advantage.

7. A rotating axial flow duct-rotor of manufacture, combining the function of controlling stream tube convergence or divergence with the function of acceleration or deceleration of axial flow as well as with the function of boundary layer transport, consisting of a plurality of blades that individually form continuously profiled, rigid spiral or ring bands, the progressive axial forward sections of which have fixed chord-axis-wise orientation to the axial-plane-relative surface inclination of coaxial truncated conoids-of-generation along said conoids' progressive increments of azimuth and axial co-latitude coordinates, said spiral bands being attached at azimuth variations around and axial location along an elongated aerodynamic body of revolution that is itself attached to fixed supports which enable it to rotate, allowing said rotating blade plurality's outer catenaries to progressively sweep out the outlines of a requisite duct shape, said continuously profiled bands combining means to eject boundary layer accumulations through tail section variations of convexity and concavity governed by a periodic function and said convexities physically delineated by characteristic helix-relative expanding isocline parabolas and axial-plane-relative parabolas of maxima of chord-normal convexity, as well as by a subtended axial angle of constant axial azimuth increment connecting said successive axial section maxima of convexity, whereby such a duct can impart measured radial accelerations or decelerations to converging or diverging peripheral flows and can therefore dispense with the expense and drag of a fixed duct, entrain greater mass flow rates per diameter of operation by reducing unwanted fluid tube expansion or contraction and thus can function to reduce or increase tip velocity, function to reduce frictional dissipation as well as function to limit spanwise flow due to planform variable sweep.

* * * * *